US 6,723,971 B1

(12) United States Patent
Petrenko et al.

(10) Patent No.: US 6,723,971 B1
(45) Date of Patent: Apr. 20, 2004

(54) METHODS AND STRUCTURES FOR REMOVING ICE FROM SURFACES

(75) Inventors: Victor Petrenko, Lebanon, NH (US); Charles Sullivan, Hanover, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 09/857,397

(22) PCT Filed: Nov. 30, 1999

(86) PCT No.: PCT/US99/28330

§ 371 (c)(1),
(2), (4) Date: May 31, 2001

(87) PCT Pub. No.: WO00/33614

PCT Pub. Date: Jun. 8, 2000

Related U.S. Application Data

(60) Provisional application No. 60/131,082, filed on Apr. 26, 1999, provisional application No. 60/122,463, filed on Mar. 1, 1999, and provisional application No. 60/110,440, filed on Dec. 1, 1998.

(51) Int. Cl.[7] .................................................. H05B 6/70
(52) U.S. Cl. ................ 219/770; 174/110 R; 244/134 R
(58) Field of Search ................................ 219/770, 497, 219/209, 772, 213; 244/134 D, 134 F, 138 R; 174/102 R, 115, 128.1; 206/318, 589; 307/147; 324/693, 694; 343/704, 840

(56) References Cited

U.S. PATENT DOCUMENTS

| 2,870,311 A | 1/1959 | Greenfield et al. |
| 4,082,962 A | * 4/1978 | Burgsdorf et al. .......... 307/147 |
| 4,330,702 A | 5/1982 | Cheng |
| 4,638,960 A | 1/1987 | Straube et al. |
| 4,897,597 A | 1/1990 | Whitener |
| 5,398,547 A | 3/1995 | Geraldi et al. |
| 5,551,288 A | 9/1996 | Geraldi et al. |
| 6,027,075 A | 2/2000 | Petrenko |

FOREIGN PATENT DOCUMENTS

| JP | 05292638 A | * 11/1993 |
| JP | 07023520 A | * 1/1995 |

* cited by examiner

*Primary Examiner*—Quang T. Van
(74) *Attorney, Agent, or Firm*—Curtis A. Vock; Lathrop & Gage L.C.

(57) ABSTRACT

In one embodiment, a system for modifying ice adhesion strength of ice adhered to an object. The system includes an electrode that is electrically insulated from the object and a DC source, e.g., a battery coupled to the object and the electrode. The source generates a DC bias to an interference between the ice and the object when the ice completes the circuit. The system preferably includes an electrically insulating material disposed-between the object and the electrode. In another embodiment, a coating comprising a ferroelectric, lossy dielectric, ferromagnetic or semiconductor material is applied to a object. Electromagnetic energy causes the coating to generate heat, which melts snow and ice.

22 Claims, 23 Drawing Sheets

METHODS AND STRUCTURES FOR REMOVING ICE FROM SURFACES

This application claims the benefit of Provisional application Ser. Nos. 60/110,440, filed Dec. 1, 1998, 60/122,463, filed Mar. 1, 1999, and 60/131,082, field Apr. 26, 1999.

U.S. GOVERNMENT RIGHTS

This invention was made in part with the support of the U.S. Government; the U.S. Government has certain rights in this invention as provided for by the terms of Grant #DAAH 04-95-1-0189 awarded by the Army Research Office and of Grant #MSS-9302792 awarded by the National Science Foundation.

BACKGROUND OF THE INVENTION

1. Field of the Invention

The invention relates to methods, systems and structures for heating ice and snow and for modifying ice adhesion strength between ice and selected objects.

2. Statement of the Problem

Ice adhesion to certain surfaces causes many problems. For example, excessive ice accumulation on aircraft wings endangers the plane and its passengers. Ice on ship hulls creates navigational difficulties, the expenditure of additional power to navigate through water and ice, and certain unsafe conditions. The need to scrape ice that forms on automobile windshields is regarded by most adults as a bothersome and recurring chore; and any residual ice risks driver visibility and safety.

Icing and ice adhesion also causes problems with helicopter blades, and with public roads. Billions of dollars are spent on ice and snow removal and control. Ice also adheres to metals, plastics, glasses and ceramics, creating other day-to-day difficulties. Icing on power lines is also problematic. Icing adds weight to the power lines which causes power outages, costing billions of dollars in direct and indirect costs.

In the prior art, methods for dealing with ice adhesion vary, though most techniques involve some form of scraping, melting or breaking. For example, the aircraft industry utilizes a de-icing solution such as ethyl glycol to douse aircraft wings so as to melt the ice thereon. This process is both costly and environmentally hazardous; however, the risk to passenger safety warrants its use. Other aircraft utilize a rubber tube aligned along the front of the aircraft wing, whereby the tube is periodically inflated to break any ice disposed thereon. Still other aircraft redirect jet engine heat onto the wing so as to melt the ice.

These prior art methods have limitations and difficulties. First, prop-propelled aircraft do not have jet engines. Secondly, rubber tubing on the front of aircraft wings is not aerodynamically efficient. Third, de-icing costs are extremely high, at $2500–$3500 per application; and it can be applied up to about ten times per day on some aircraft. With respect to other types of objects, heating heating ice and snow is common. But, heating of some objects is technically impractical. Also, large energy expenditures and complex heating apparati often make heating too expensive.

The above-referenced problems generally derive from the propensity of ice to form on and stick to surfaces. However, ice also creates difficulties in that it has an extremely low coefficient of friction. Each year, for example, ice on the roadway causes numerous automobile accidents, costing both human life and extensive property damage. If automobile tires gripped ice more efficiently, there would likely be fewer accidents.

SOLUTION

In certain embodiments of the present invention, electrical energy in the form of a direct current ("DC") bias is applied to the interface between ice and the object that the ice covers. As a result, the ice adhesion strength of the ice to the surface of the object is decreased, maing it possible to remove ice from the object by wind pressure, buffeting or light manual brushing.

Other above-referenced problems would be lessened if the ice adhesion strength between ice and surfaces of objects in contact with the ice were increased. For example, if the ice adhesion strength were increased between automobile tires and icy roadways, then there would be less slippage and fewer accidents.

If a charge is generated at the interface of ice in contact with a object, it is possible to selectively modify the adhesion between the ice and the object.

In one aspect, the invention provides a power source connected to apply a DC voltage across the interface between ice and the surface upon which the ice forms. By way of example, the object having the conductive surface can be an aircraft wing or a ship's hull (or even the paint applied to the structure). A first electrode connects with the surface; a nonconductive or electrically insulating material is applied as a grid over the surface; and a second electrode is formed by applying a conductive material, for example conductive paint, over the insulating material, but without contacting the surface. The surface area of the second electrode should be small as compared to the overall surface area protected by the system. By way of example, the surface area of the object being protected (i.e., that area sought to be "ice-free") should be at least about ten times larger than the surface area of the second electrode.

One or more wires connect the second electrode to the power source; while one or more wires connect the first electrode to the power source. Ice forming over the surface and the conductive grid second electrode completes the circuit. A voltage is then applied to the circuit, selectively, which controllably modifies the ice adhesion strength of the ice with the object.

A voltage regulator subsystem also preferably connects with the circuit so as to adjustably control the voltage applied across the interface and so as to achieve control over the ice adhesion strength. Ice made from different concentrations of ions can modify the optimum voltage for which the ice adhesion strength is at a minimum; and the voltage regulator subsystem thereby provides a mechanism by which the minimum can be changed selectively.

Other subsystems preferably connect with the circuit to provide other features, for example to detect whether water or ice completes the circuit. In one aspect, the power source is a DC supply (e.g., a battery) which provides voltage to the circuit and which connects to the deicing electrodes. In another aspect, a DC ammeter connects with the circuit to measure the DC conductivity of the ice (i.e., the semi-conductive layer which "shorts" the two electrodes when formed over the surface and any part of the grid second electrode). In another aspect, an AC supply connects with the circuit to generate AC voltages between about 10 kHz and 100 kHz, selectively. According to another aspect, an AC ammeter also connects with the circuit to measure the AC conductivity of the ice at frequencies within the 10–100 kHz range. In still another aspect, a current comparator compares the AC and DC conductivities.

These aspects thus provide circuitry which can, for example, distinguish whether the semi-conductive layer formed over the surface is ice, which might be dangerous, or surface water. The AC conductivity (in the above-mentioned range) and DC conductivity of water are substantially the same. With respect to ice, however, the AC conductivity and DC conductivity differ by two to three orders of magnitude. This difference in conductivity is measured by the respective ammeters and is compared in the current comparator. When the difference in conductivity is greater than a predetermined set point, the current comparator signals an icing alarm. At this point, for example, the voltage regulator subsystem can operate to apply a DC bias to the circuit—and thus to the interface—at a desired field strength which sufficiently reduces the ice adhesion strength. According to one aspect of the invention, when ice is detected on an aircraft wing, the icing alarm initiates a feedback loop within the system which (a) measures ice conductivities, (b) determines appropriate bias voltages to reach minimum (or near minimum) ice adhesion conditions, and (c) applies a bias voltage to the ice-wing interface to facilitate ice removal.

Those skilled in the art should appreciate that the above-described system can be applied to surfaces of many objects where it is desired to reduce ice adhesion strength, such as on car windshields, ship hulls and power lines. In such cases, if the surface of the object is weakly conductive, it is desirable to "dope" the surface of the object such that it is sufficiently conductive. Doping techniques are known to those in the art. Automobile tires, for example, can be doped with iodine to make the rubber conductive. Automobile glass, likewise, can be doped with either ITO or fluoride doped $SnO_2$ to make the windshield an acceptable semiconductor.

In preferred embodiments in accordance with the invention, the ice is doped with a salt, which increases the electrical conductivity of the ice for the DC bias and enhances the effect of the DC bias on the adhesion strength. Preferably, doping is accomplished by applying a porous material to the surface of the object to be protected. The porous material is impregnated with salt, and then the porous material releases small amounts of salt into the ice when it forms. Also, the object being protected against ice and snow may be doped in order to increase the electrical conductivity of the object, especially at its surface.

In another embodiment in accordance with the invention, a self-assembling monolayer ("SAM") is applied to the surface of the object to be protected. The material forming the SAM is selected to have high adhesion to the surface. The SAM material is also selected to be either hydrophobic or hydrophilic, to decrease or increase ice adhesion strength.

In another aspect, the invention provides a system and method for deicing power lines and other objects. The surface of the object, such as power lines, is coated with a material that absorbs electromagnetic energy. The absorption of the electromagnetic energy heats the power lines above the ice's melting point, thus melting the ice. The coating material may be a ferroelectric, a semi-conductor, or a ferromagnetic material. In one embodiment, the coating has properties that depend on a specific temperature based on either the dielectric or magnetic loss. These properties cause the absorption of electromagnetic energy and the resulting heating of the wires only when the ambient temperature drops below the ice's melting point. Alternatively, the coating material could be turned "on" or "off" if a separate power supply is used to heat the coating.

In a particular variation, ice itself is utilized as a lossy dielectric coating at high frequency, such as at 60 kHz. Further, skin-effect heating at high frequency may be utilized to melt ice and snow on power lines.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE PREFERRED EMBODIMENTS

Figure 1:
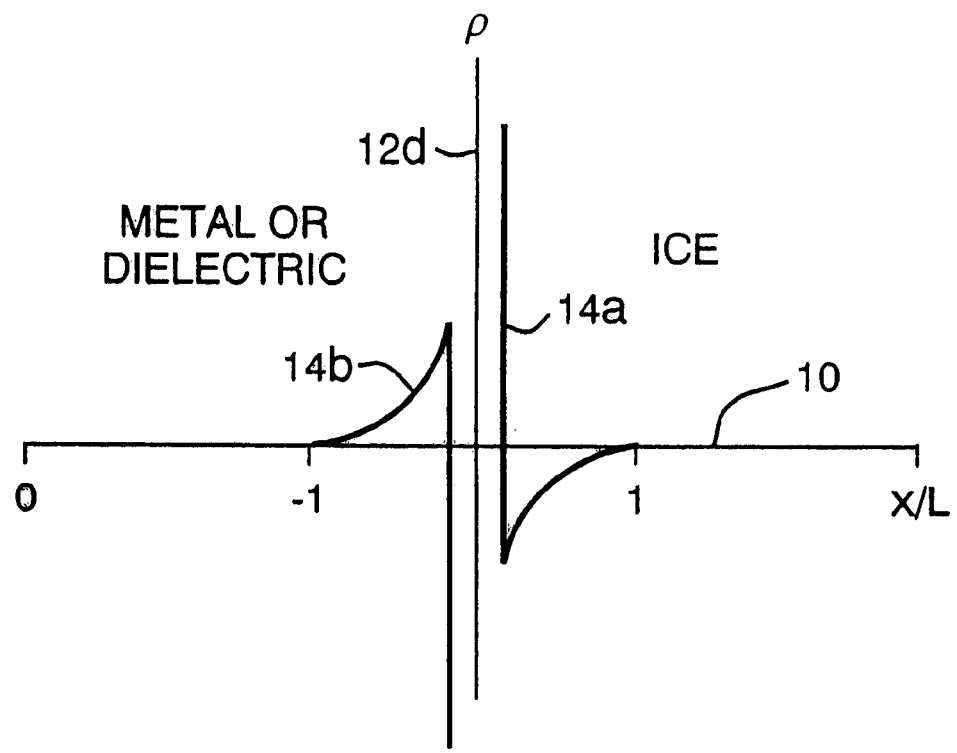
FIG. 1 illustrates a relationship between molecular polarization P and space charge density ρ as a function of distance from an ice-metal interface.

The invention includes methods, systems and structures which remove ice and snow from surfaces of objects. Certain embodiments modify ice adhesion strength to objects such as metals and semiconductors by application of a DC bias to the interface between the ice and the objects. The invention can thus be used to reduce and in some cases eliminate the adhesion of ice onto surfaces of such objects.

In certain embodiments, the invention modifies the electrostatic interactions which form the bonding between ice and metals. These interactions are effectively changed (either reduced or enhanced) by application of a small DC (direct current) bias between the ice and the metals.

In certain embodiments, the invention includes systems and methods for using coating materials to absorb electromagnetic energy. This absorption will heat the coating material and the object coated to melt the ice.

Ice has certain physical properties which allow the present invention to selectively modify the adhesion of ice to conductive (and semi-conductive) surfaces if a charge is generated on the surface coming on contact with ice, it is possible to selectively modify the adhesion between the two surfaces. First, ice is a protonic semiconductor, a small class of semiconductors whose charge carriers are protons rather than electrons. This phenomenon results from hydrogen bonding within the ice. Similar to typical electron-based semiconductors, ice is electrically conductive, although this electrical conductivity is generally weak.

Another physical property of ice is that its surface is covered with a liquid-like layer ("LLL"). The LLL has important physical characteristics. First, the LLL is only nanometers thick. Second, it ranges in viscosity from almost water-like, at temperatures at or near to freezing, to very viscous at lower temperatures. Further, the LLL exists at temperatures as low as −100° C.

The LLL is also a major factor of ice adhesion strength. The combination of the semiconductive properties of ice and the LLL allows one to selectively manipulate ice adhesion strength between ice and other objects. Generally, water molecules within a piece of ice are randomly oriented. On the surface, however, the molecules are substantially oriented in the same direction, either outward or inward. As a result, all their protons, and hence the positive charges, either face outward or inward. While the exact mechanism is unknown, it is likely that the randomness of water molecules transitions to an ordered orientation within the LLL. However, the practical result of the ordering is that a high density of electrical charges, either positive or negative, occurs at the surface. Accordingly, if a charge is generated on the surface coming on contact with ice, it is possible to selectively modify the adhesion between the two surfaces. As like charges repel and opposites attract, an externally applied electrical bias at the interface of the ice and the other surface either reduces or enhances the adhesion of the ice to the other object.

FIG. 1 illustrates a relationship between molecular polarization P and space charge density ρ as a function of distance from an ice-metal interface. In FIG. 1, electrical charge induced in a metal is equal in magnitude and opposite in sign to the charge in ice. In the graph of FIG. 1, charge density ρ within ice (curve 14b) near the ice-metal interface (data 14a) and within metal or dielectric material (curve 14b) near the same interface is plotted as a function of distance from the interface. The value on the abscissa, x/L, represents the fraction of the distance L, known as the screening length. The interaction between ice surface charges and the charge induced in a solid object affects the strength of an ice-solid interface.

Sophisticated calculations of the electrostatic interaction energy between ice surface charges and metals have been calculated and are in agreement with empirically measured values indicating that the interaction energy is typically in a range of from 0.01 to 0.5 J/m$^2$ at −100° C. The lower limit 0.01 J/m$^2$ corresponds to pure ice; while the upper value 0.5 J/m$^2$ corresponds to ice heavily doped with salt.

Since electrostatic interactions contribute to ice adhesions, the adhesion strength between ice and a conductive material (e.g., a metal or semiconductor) is changed by an external DC bias applied across the ice-material interface.

Ice includes polar water molecules that strongly interact with any solid substrate which has dielectric permittivity different from that of ice. In addition, there is theoretical and experimental evidence for the existence of a surface charge in ice. This surface charge can also interact with the substrate.

EXAMPLE 1

Figure 2:
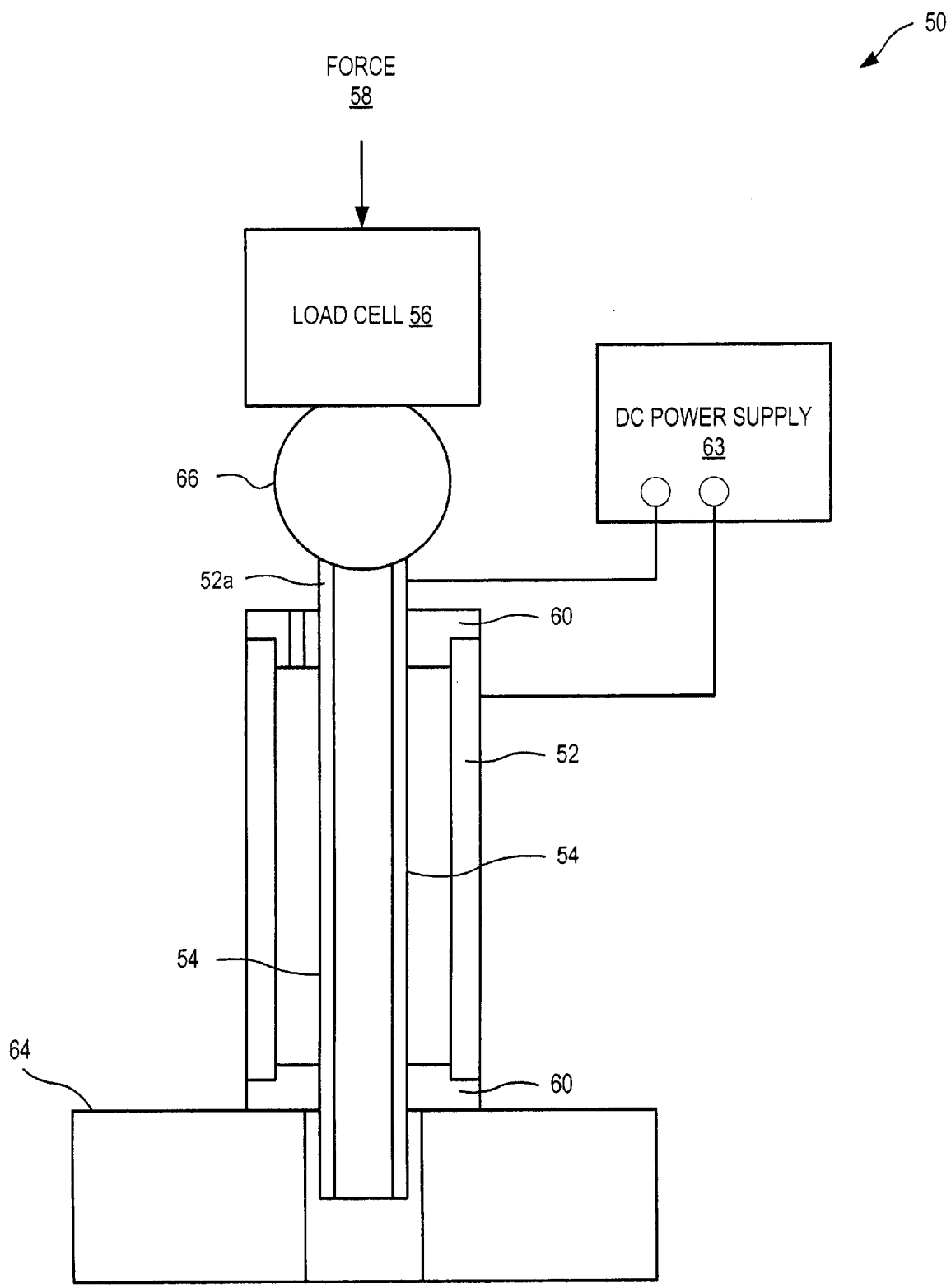
FIG. 2 depicts an apparatus for studying the effect of DC bias on ice adhesion to solid metals.

The effect of DC bias on ice adhesion to solid metals was studied. A: system 50 as shown in FIG. 2 was used. The space between the stainless steel tubes 52, 52a was filled with 0.5% solution of NaCl in water and the system 50 was then placed into a cold room with temperature −10° C. Multiple systems 50 were also filled with saline water. The water salinity was close to the salinity of ordinary ocean water. All the samples were kept for three hours inside the cold room before testing, a time sufficient for water to freeze and for formed ice to relax from internal stress. Maximum shear strength of the ice-steel interface 54 was measured when the samples were loaded (via the load cell 56, with applied force 58) with a constant strain rate of 100 μm/min. DC bias in the range from −21 V to +21 V was applied and maintained between the stainless steel tubes 52, 52a at the beginning of loading. Teflon caps 60 permitted movement of the inner stainless steel tube 52a relative to the ice. A DC power supply 63 provided the DC bias during experimentation. The system 50 was supported by a platform 64. An insulating ball 66 thermally and electrically decoupled the load cell 56 from the rest of the system 50.

During mechanical tests, the electric current, load and temperature were recorded on a computer hard drive. A data acquisition board DAS-1800 and Lab View software were used for data recording.

Since ice adhesion is very sensitive to salt concentration, the concentration was measured in melt of the samples after the tests/Before and after, the surfaces of the stainless steel tubes 52, 52a were washed with a mild abrasive-containing washer, rinsed first in distilled water, methanol, and again in distilled water. The cleaning procedures and the control of salt concentration are important for data reproducibility.

To determine if an application of DC power (from the supply 63) causes a change in ice temperature, a thermocouple (not shown) was placed in the ice 62 between the stainless steel tubes 52, 52a in several tests. Within the precision of these tests (+0.05° C.), no change in temperature was noted.

The results of such tests are summarized in Table 1 below, which illustrates that for voltages tested, a significant decrease in maximum interfacial shear strength, $T_{max}$, was observed. This effect was particularly large for V=+6.6 volts.

TABLE 1

Maximum interfacial shear strength $T_{max}$ and residual shear strength $T_{res}$ of ice-steel interfaces at T = −10° C. and ice doped with 0.5% NaCl.

| DC bias (volts) | $T_{max}$ (kPa) | $T_{res}$ (kPa) |
| --- | --- | --- |
| 0 | 64 ± 6 | 21 ± 2 |
| 6.6 | 37 ± 7 | 13 ± 3 |
| −1.0 | 45 ± 5 | 12 ± 2 |
| −1.8 | 48 ± 7 | 19 ± 3 |

Figure 3:
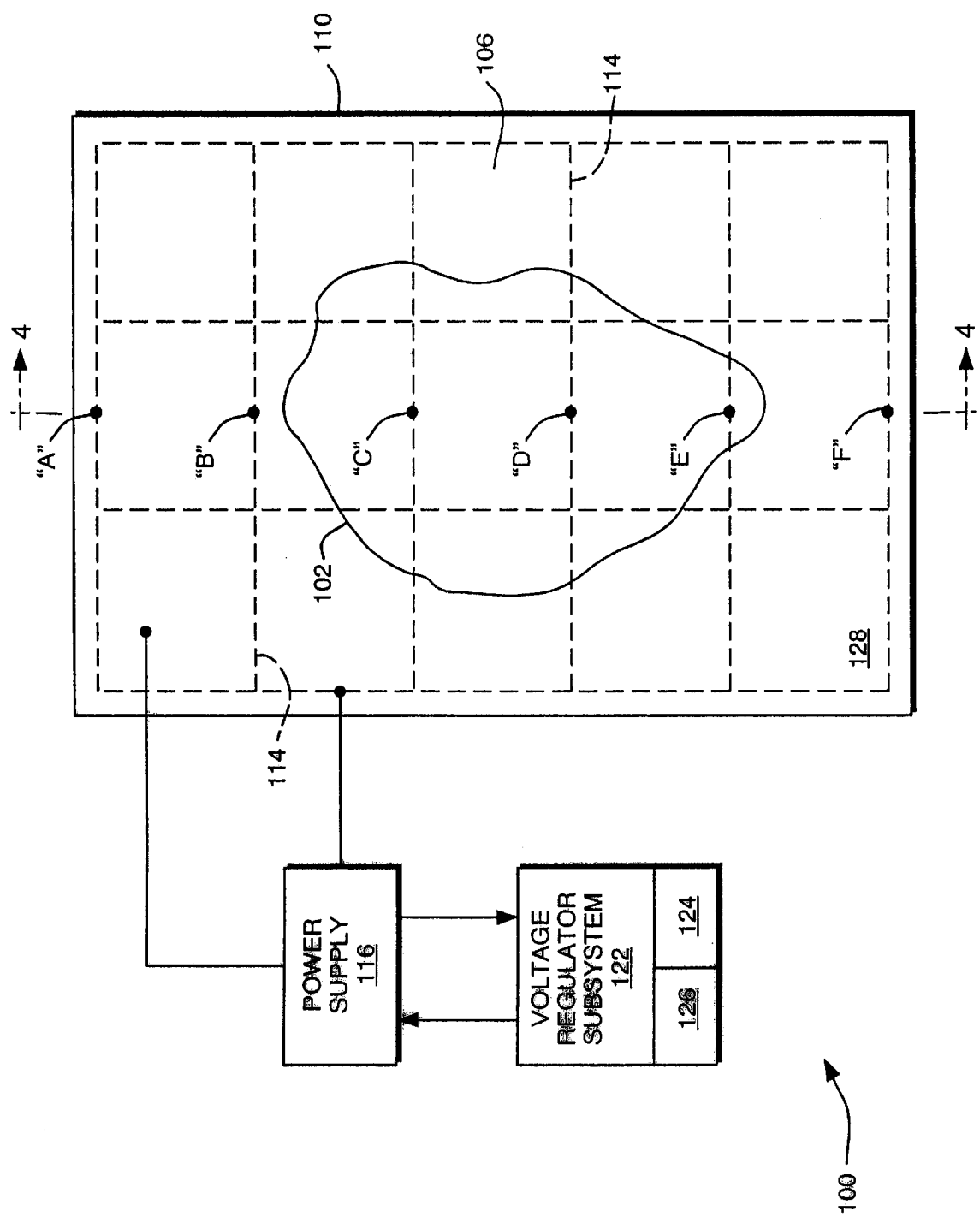
FIG. 3 (and cross-sectional view FIG. 4) depict a system in accordance with the invention that operates to reduce the adhesion of ice formed on a surface.

FIG. 3 (and cross-sectional view FIG. 4) depict a system 100 in accordance with the invention. System 100 operates to reduce the adhesion of ice 102 formed onto the surface 106 of an object 110. The system 100 forms a circuit that includes object 110 a conductive grid 114 (including illustrative points "A"–"F" on the grid), and a power supply 116. The grid 114 is suspended above the surface 106 so that it remains electrically insulated from object 110.

Figure 4:
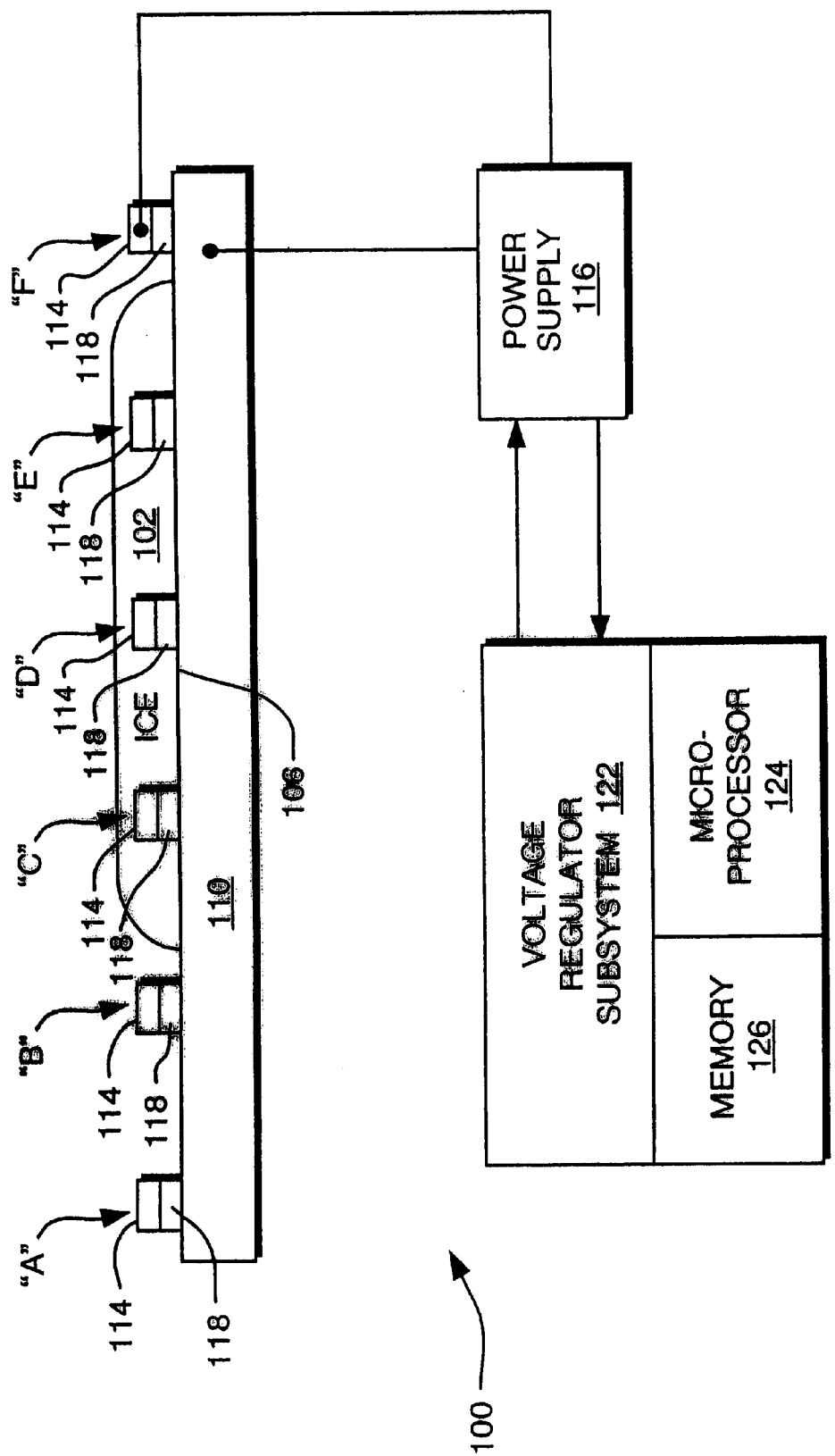

In a preferred embodiment of the invention, the suspension of the grid 114 over the surface 106 is obtained through use of an insulating grid 118 disposed between the grid 114 and the surface 106. FIG. 4 illustrates the grid 118 in greater detail. The cross-sectional view of FIG. 4 is not to scale so as to illustrate the relationship of the insulating grid 118 and the conducting grid 114. In reality, the thickness (in the dimension of FIG. 4) of the grids 114, 118 can be much smaller than an inch (even as low as 0.010 to 0.020 inch); and can be considered as "coatings". By way of example, the grid 118 can be made from a thin coating of electrically insulating paint; while the grid 114 can be made from a thin coating of electrically conductive paint. The grid 114 is connected so as to function as a single electrode object 104 thus becomes a first electrode of the system 100; and the grid 114 becomes the second electrode in the circuit.

Grids 114, 118 can also be pliant and formable over the surface 106, which can represent any shape even though a flat surface 106 is shown. By way of example, object 110 can represent an aircraft wing or a car windshield; and the grids In a preferred embodiment, discussed below with reference to FIG. 3, a porous doping layer is interposed between object 110 and insulator grid 118.

When ice 102 forms onto the surface 106, the circuit of system 100 is completed as the ice 102 operates as a semiconductor (as discussed above). When the circuit is completed, the power supply 116 provides a DC bias to the interface between the ice 102 and the object 110. The bias is typically less than a few volts; and thus a battery can function as the power supply 116.

The magnitude of the bias depends upon the desired application. In the case of a car windshield or an airplane wing, the bias is selected so that a minimum (or near-minimum) ice adhesion results, thereby facilitating the removal of the ice 102 from object 110.

A voltage regulator subsystem 122 is also preferably connected in circuit with the system 100. As described in more detail below, the voltage regulator subsystem in 122 operates in feedback with the circuit and the power supply 116 so as to decrease or increase the DC bias in an optimum fashion. By way of example, the subsystem can include circuitry and a microprocessor 124 to measure data from the circuit and to determine the conductivity (and/or temperature) of the ice 102. Such measurements are used in turn by the subsystem 122 to generate a signal which effectively changes the amount of the DC bias applied to the circuit. Specifically, in one embodiment, the power supply 116 is responsive to the signal to generate the right voltage at the ice-object interface. The value of the DC bias can be stored in memory 126 within the subsystem 122 such as through a look-up table and based upon experimental data. For example, ice with a conductivity of "X" (as measured by the subsystem, in real time preferably) in contact with object 110 of conductivity "Y" (known a prori, as the system 100 is installed with object 110 for a given application) will be used through the look-up table in memory 126 to determine which voltage to apply to the ice-object interface.

The grid electrode 114 is preferably spaced so as to ensure (as best as possible) that ice 102 formed onto the surface 106 will contact at least some portion of the grid 114. With reference to FIG. 3, for example, the ice 102 comes in contact with several areas of the grid 114, including at points "C"–"E". Accordingly, the circuit of system 100 will be completed as the ice 102 "shorts" at least one part of the grid to object electrodes 110, respectively.

The actual size of the spacing between conductive areas of the grid 114—for example, the area 114 of FIG. 3—should be sized for the specific application. By way of example, if the surface 106 is the surface of an aircraft wing, then the spacing can be relatively large, e.g., greater than one square foot.

Figure 5:
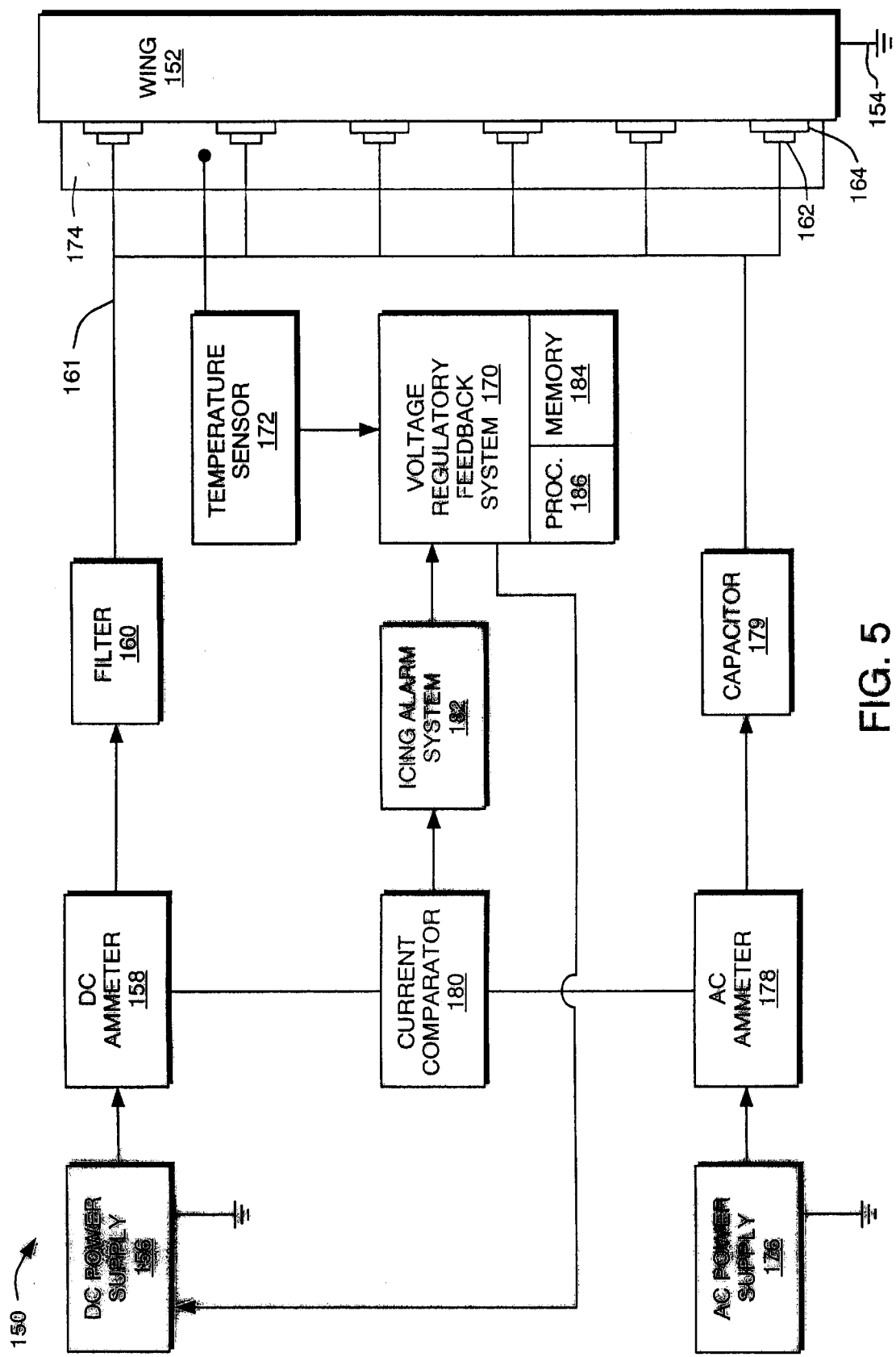
FIG. 5 illustrates a system for applying a DC bias to reduce ice adhesion in accordance with the invention.

By way of example, FIG. 5 illustrates a system 150 constructed according to the invention. One electrode of the subsystem 170 is the aircraft wing 152. The aircraft wing 152 is electrically coupled to ground 154. A DC power supply 156 is electrically coupled to a DC ammeter 158. The DC ammeter 158 is electrically coupled to an filter 160. The filter 160 is electrically coupled through wiring 161 to a conductive paint 162 (or other wing-conformal, conductive equivalent) which is applied to the insulating layer 164 fixed on the aircraft wing 152.

The insulating layer 164 and conductive paint 162 are preferably arranged as a grid pattern, such as described in connection with FIG. 3 and FIG. 4 Accordingly, the power supply 156 connects to the conductive paint 162 and to ground through the wing electrode 152. As ice forms on the wing 152, the circuit is shorted by the ice and a DC bias is applied at the ice-wing interface so as to reduce ice adhesion and to facilitate ice removal.

Typically, the total area covered by the insulating layer 164 does not exceed about 1% of the protected surface. A manufacturer that has historical or other data on typical ice deposits for the particular wing or other structure being protected can thus select the type of grid applied.

The voltage applied between the grid electrode 162 and wing (or other surface) electrode 152 is generally adjusted to between one and six volts, with a corresponding current below 1A per m² of the grid area.

Those skilled in the art should appreciate that a wide variety of commercially available insulating lacquers and conductive paints may be used to fabricate system 100, and that a particular brand should be chosen after testing of icing simulations. Furthermore, the optimal spacing of the grid (i.e., of area 128 of FIG. 3) should also be determined experimentally or through analysis for a particular design.

With further reference to FIG. 5, the DC ammeter 158 can additionally couple to a feedback subsystem 170. The feedback subsystem 170 in turn electrically couples to the DC power supply 156 to "control" the DC bias applied to the wing-ice interface, depending upon characteristics such as ice conductivity and temperature. A temperature sensor 172 thus also preferably connects with the system 150 to measure the temperature of the ice 174.

Further features of the system 150 can include an AC power supply 176 (operating between about 10 kHz and 100 kHz) electrically coupled to an AC ammeter 178, which in turn electrically couples to the conductive paint 162. A current comparator 180 is electrically coupled to both the AC ammeter 178 and the DC ammeter 158.

An icing alarm subsystem 182 can also be included with the system 150. The current comparator 180 can for example couple to the icing alarm subsystem 182 and to the feedback subsystem 170 so as to initiate certain events, such as discussed below.

The DC ammeter can be used to measure the DC conductivity of the circuit 150. The DC conductivity signal measurement is provided to the feedback subsystem 170, which in turn regulates the current supplied by the DC power supply 156, and to the current comparator 180.

The AC ammeter can be used to measure the AC conductivity of the circuit 150 within the applied frequency range of 10–100 kHz, for example. The AC conductivity signal measurement is provided to the current comparator 180 (and optionally to the feedback 170 for calculating the ratio AC/DC and for data processing). A comparison between the AC and DC conductivities is used by the system 150 to distinguish between water and ice, both of which "short" and complete the circuit. Specifically, the ratio of the AC to DC conductivity is 2–3 orders of magnitude greater in the case of ice as compared to water, providing a signal measurement which readily distinguishes ice over water.

As ice forms on the wing 152, therefore, the current comparator 180 signals the feedback subsystem 170 which in turn commands the DC power supply 156 to increase or decrease the DC bias at the ice-wing interface. The DC bias is selected at a magnitude (generally between one and six volts) so as to minimize ice adhesion strength of the ice 174 on the wing 152.

Upon deicing of the wing 152, the signal differential received by the current comparator 180 drops below a preset value; and the current comparator 180 deactivates the icing alarm 182. Simultaneously, the current comparator 180 signals the feedback subsystem 170 which in turn commands the DC power supply 156 to decrease the bias to the initial level.

In summary, the ammeters 158 and 178 are used to determine conductivity of the material which shorts between the grid electrode 162 and the wing 152. As shown, that material is ice 174. The system 150 thus distinguishes between ice and water in an automatic manner. The filter 160 prevents AC voltage from entering the "DC" parts of the circuit, which should be accurately controlled to modify the ice adhesion strength. The feedback subsystem 170 can and preferably does include a microprocessor and memory to command and control the power supply 156 at a near-optimum DC bias based upon feedback data such as ice temperature and ice conductivity (and/or ice purity). The feedback circuitry preferably increases or decreases DC bias voltages at a level that provides a density of about 0.1 $mA/cm^2$ (or about 1 $mA/in^2$ current density at the ice-wing interface) after receiving an ice alarm signal from the subsystem 182. Accordingly, for a current of about 10–30A, a total energy consumption of about 100–500 watts is required for a typical large airplane.

The "DC" parts of the circuit of FIG. 5 thus primarily operate to provide DC bias to the ice-wing interface, and, secondarily (if desired) to measure the DC conductivity of the ice 174. The "AC" parts of the circuit of FIG. 5 thus primarily operate to measure the AC conductivity. The remaining portions of the circuit of FIG. 5 thus provide: (a) an filter to prevent signal coupling between the DC and AC parts; (b) feedback and measurement and control circuitry to control the applied DC bias based upon detection of ice (as compared to water) and/or measured feedback parameters such as ice temperature and conductivity. A computer apparatus utilizing an appropriate software program may be used in conjuction with microprocessors and computer memory to obtain more accurate and precise control. A user interface allows interactive monitoring, control and operation of system 150.

Figure 6:
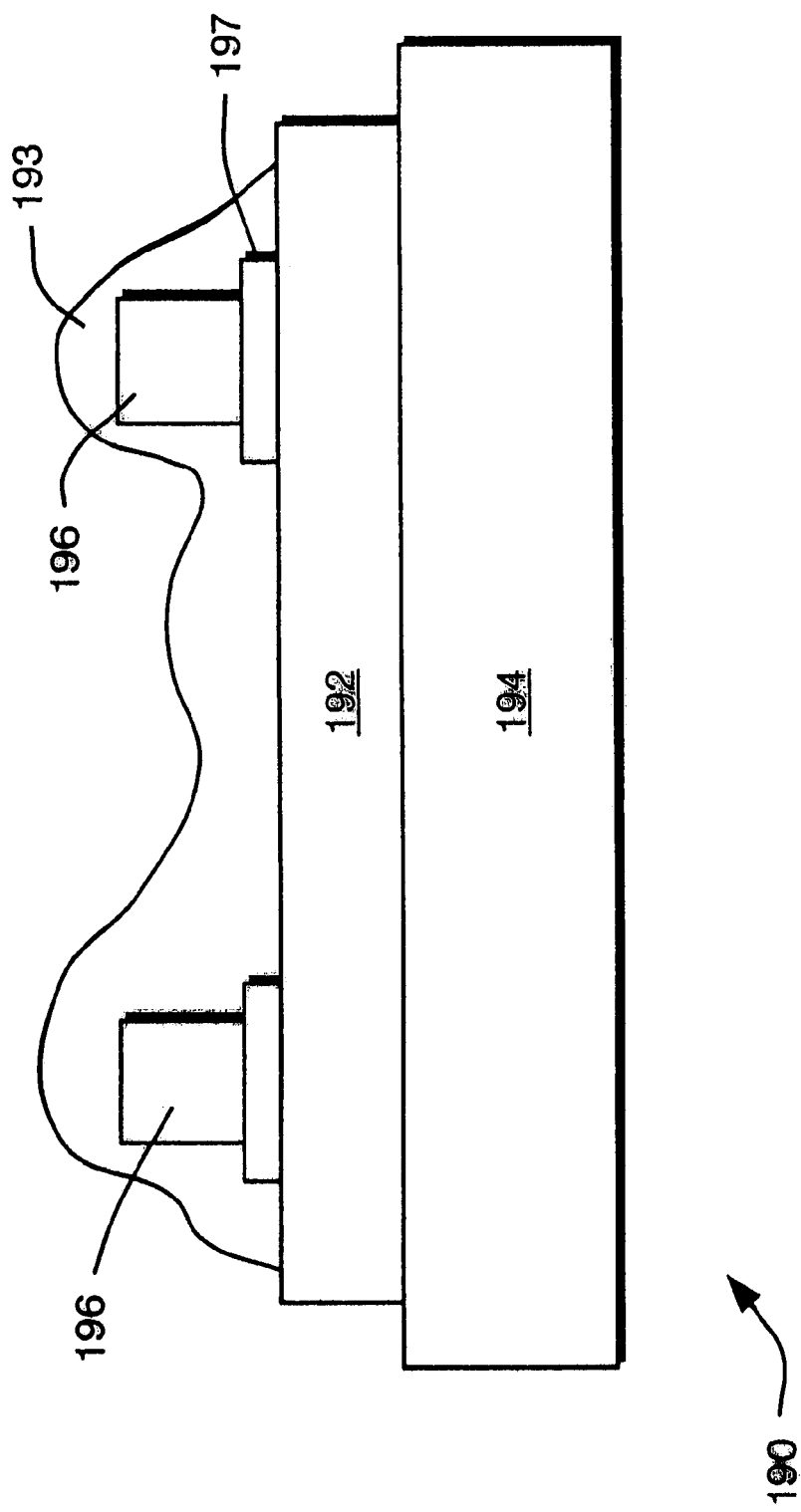
FIG. 6 depicts an embodiment having ion-doped porous material in accordance with the invention.

FIG. 6 depicts a preferred embodiment 190 in accordance with the invention, which is a variation of the structure and system depicted in FIGS. 3–4. In FIG. 6, a "porous" layer or material 192 is utilized to dope ice 193 adhered to a surface 195 of object 194, which serves as an electrode. As described above, electrodes (e.g., grid electrodes) 196 are used to create a desired current density at the interface between the ice 193 and the porous layer 192 to modify ice adhesion strength. An insulating layer 197 keeps the electrode 196 from shorting through the porous material 192 until ice 193 forms thereon.

In operation, a voltage is applied to the surface electrode 195 and the grid electrode 196. The insulating layers 197 prevent the surface electrode 195 and the grid electrode 196 from shorting with the porous layer 192. The ice 193 begins to form on the porous layer 192. The porous layer 192 releases the dopants to the ice 193, which improves the ice's conductivity. The voltage applied from the surface electrode 195 and the grid electrode 196 reduces the ice adhesion of the ice 193 and melts the ice 193.

In very cold, high altitude conditions such as in aircraft travel, ice is very pure and/or non-conductive. The embodiment of FIG. 6 is useful in that the material 192 has pores which can be doped in a manner which will release ions into the ice 192. To enhance electrical conductivity of pure ice and of ice at very low temperature, ions released by the porous layer 193 increase conductivity.

Note that the porous layer 193 of FIG. 6 can be a thin coating which is nearly insolvable with respect to water. When water adheres to the layer 192, the layer 192 dopes the water/ice with ions, creating conductivity. The ions should correspond to the expected temperatures of the ice, which itself has a conductivity dependent upon temperature.

Prior to use, the porous material 192 is saturated with a water solution of dopants that enhance ice electrical conductivity, such as alkali, acids, salts etc. For example, electrolyte solutions of KOH, HF, NaCl, KCl, can be used. When the material 192 is put in contact with supercooled water droplets or ice, it releases a small amount of the dopants in the water and ice. The dopants dopes the ice 193 with ions, thus enhancing the ice conductivity. Because even a trace amount of dopants in ice can increases its conductivity by several orders of magnitude, once "charged" with the solution the electrodes can doped ice many times before they must be recharged again (once a month for example). The "re-charging" can be done simply by washing the porous material 192 with one of the solutions mentioned above.

Note that layer 192 is shown grossly over-sized for purposes of illustration. Layer 192 can be a very thin layer or nearly a paint covering the base surface 195 of object 194, for example, of an aircraft wing. Subsequent doping can be done as needed to ensure continued ice-enhancing conductivity.

Note that a layer 192 of porous material is not necessary if, instead, the grid electrodes 196 are porous in nature and release dopants into ice. The choice of whether to use a porous layer 192 or porous electrodes 196, or both, to provide doping is a matter of design choice and, for example, the spacing of the electrode grid.

The porous layer 192 of material could be any material that has pores that can be doped to release ions into the ice 193. The material of the porous layer 192 could be any porous ceramic, metal or alloy. In some embodiments, the porous layer 192 could be a very thin layer, which is nearly insolvable with respect to water, such as a coat of paint covering the surface 195.

There are a wide variety of porous ceramics, metals and alloys that are commercially available for use as a porous material, including the following:

(1) percolated porous electrodes composed of sintered metal; see, Vilar et al., Percolated porous electrodes composed of sintered metal—Hydrodynamics and mass transfer, *Canadian Journal Of Chemical Engineering*, 76:(1): 41–50 (1998);

(2) porous graphite-intercalation system for rechargeable batteries; see, Barsukov, Porous Graphite-Intercalation System For Rechargeable Batteries, New Materials: *Conjugated Double Bond Systems*, 191: 265–268 (1995);

(3) porous iron electrodes containing metal additives; see, Jayalakshmi et al., Electrochemical Characterization Of Porous Iron Electrodes, *Proceedings Of The Indian Academy Of Sciences-Chemical Sciences*, 103:(6): 753–761 (1991).

Another novel embodiment of the invention is a coating of a self-assembling monolayer ("SAM") on a surface of an object to be protected from ice and snow. In accordance with the invention, a metal surface is coated with a monomolecular layer of specific organic molecules that have strong hydrophobic properties. SAMs form when linear organic molecules spontaneously adsorb to a solid surface. A desired SAM has a strong adhesion to the specific metal to which it is applied, is hydrophoboic, and reduces the strength of hydrogen bonding between ice and the metal surface. Self-asembling monolayers of molecules well known in molecular engineering and biochemistry are used for this purpose. The chemical functionality of the head, or surface end, of the SAM molecule is selected to adhere to the metal surface, and the functionality of the tail end, which typically extends from the surface on the order of 1–2 nanometer, is selected to be hydrophobic. For example, a typical hydrophobic tail comprises an alkane group, such as a methyl group.

EXAMPLE 2

Figure 7:
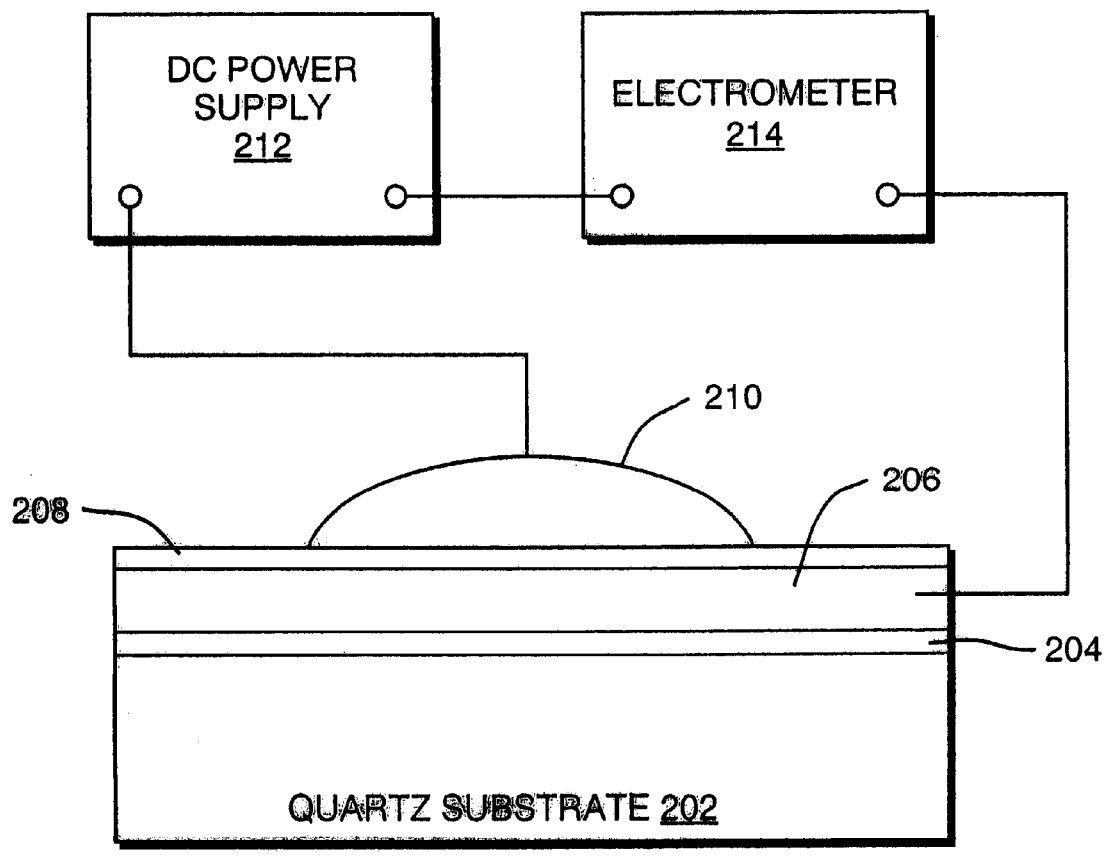
FIG. 7 depicts an embodiment of the invention having a self-assembling monolayer.

FIG. 7 depicts an embodiment of the invention for ice on a SAM. A chrome layer 204 was formed on a quartz substrate 202. A gold layer 206 was formed on chrome layer 204. Then, a Self Assembling Monolayer (SAM) 208 was formed on gold layer 206. A drop 210 of water or ice was disposed on top of the SAM 208. A DC power supply 212 was attached to the drop 210 and an electrometer 214. The electrometer 214 was attached to the gold layer 206. The electrometer 214 measured the interfacial charge density by operating in coulomb-meter mode, while the DC bias of the DC power supply 212 and the hydrophobic properties of the SAM 208 varied.

The preparation of the SAM 208 used gold-plated optical mirrors. The gold layer 206 was rinsed with ethanol and then blow dried with a stream of nitrogen. The gold layer 206 was then immersed for 12–36 hours within the appropriate solution described above for the specific hydrophobic and hydrophilic properties. The gold layer 206 was then removed from the solution and rinsed 5–10 times in ethanol. The gold layer 206 was dried under a stream of nitrogen for 10–15 seconds.

For hydrophobic samples, a 1 mM stock solution of reagants was prepared from 1 dodecanethiol [$CH_3(CH_2)_{11}SH$] by dissolving the 138.8 $\mu$L dodecanethiol in 1L of either methanol or ethanol. For hydrophilic samples, a 1 mM stock solution of reagants was prepared from 11-mercapto-1-undecanol [$HO(CH_2)_{11}SH$] by dissolving the 0.2044 g $\mu$L 11-mercapto-1-undecanol in 1L of methanol. To prepare the SAM 208 with certain hydrophobic and hydrophilic properties, the two solutions were mixed in the ratio of interest.

Without an external DC voltage applied, the contact angle of the water with the hydrophobic SAM 208 was between 98 degrees and 104 degrees. The contact angle of the water with the hydrophilic SAM 208 was between 36 degrees to 38 degrees. With varying hydrophobic and hydrophilic properties, the work of adhesion of water to the SAM 208 varied in the range of from 130 mJ/m$^2$ to 54 mJ/m$^2$. The application of a small DC voltage dramatically changed the contact angle and the work of adhesion. The application of −4.5 volts decreased the contact angle from 100 degrees to 40 degrees. This corresponds to a change in the work of adhesion from 59.5 mJ/m$^2$ to 127 mJ/m$^2$.

De-icing of Power Lines

Figure 8:
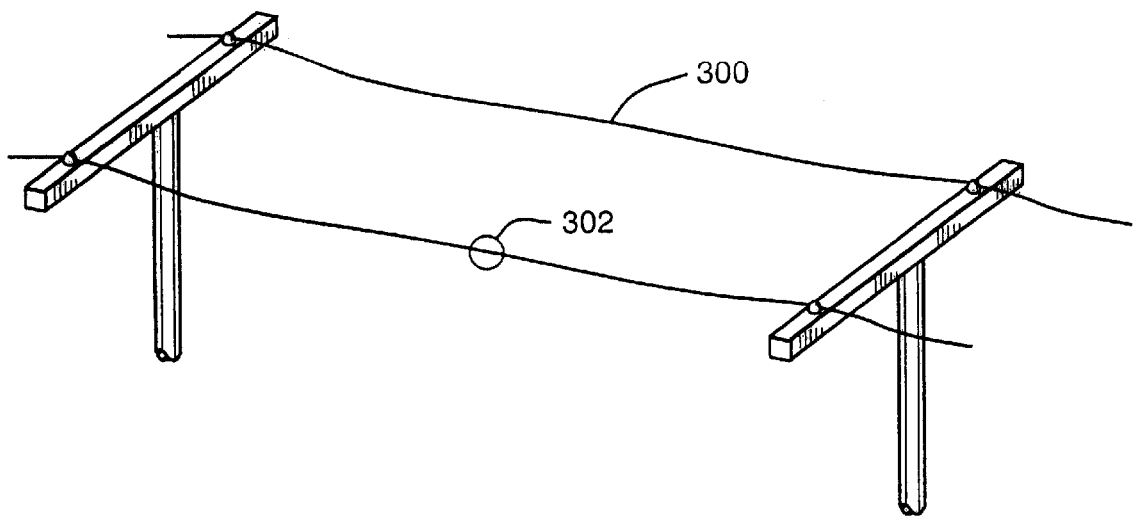
FIG. 8 depicts an embodiment of the invention suitable to reduce or remove ice from coated power lines.
Figure 9:
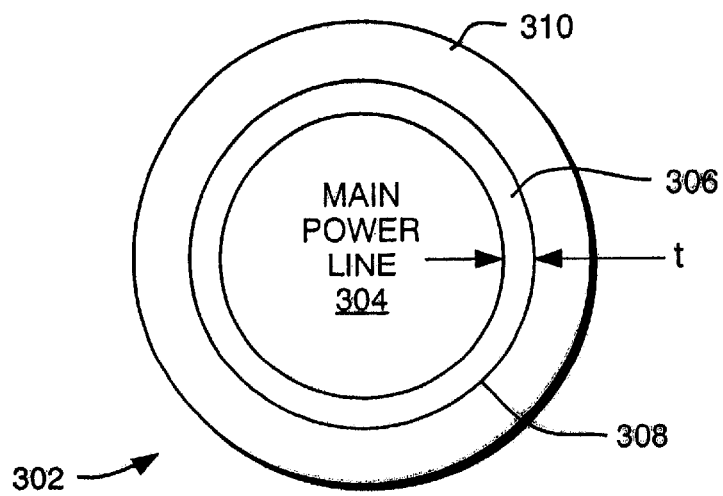
FIG. 9 shows a cross-sectional view of a coated power line fabricated in accordance with the invention.

FIG. 8 and FIG. 9 depict an embodiment of the invention suitable to reduce or remove ice from power lines 300. FIG. 9 shows a cross-sectional view 302 of power line 300 constructed according to the invention. As known in the art, a typical main power line 304 carries power at 60 Hz, but with very high E-fields such as 4,000 volts/cm. In accordance with the invention, a coating 306 is applied over the line 304 at a thickness of "t".

The coating 306 generates heat in the presence of an AC field such as generated by the main power line 304. Specifically, it exhibits hysteresis that generates heat over the AC cycle; and the coating thus generates heat due to the oscillating E-field of the line 304. This embodiment of the invention generates the heat from previously unused power to melt the ice off the power line. This embodiment utilizes the electric fields that already exist due to the current flowing through the power line.

In one embodiment, the coating 306 is a ferroelectric material, as known in the art. Ferroelectric materials are essentially ceramics that exhibit a very high dielectric constant (e.g., 10,000) and very high dielectric loss (e.g., tan $\delta \approx 10$) at certain conditions, and a relatively low dielectric constant (3–5) and small dielectric loss at other conditions. One condition that can change the constant is temperature. In a preferred aspect, the material is selected so that above freezing, the dielectric constant is low, and below freezing temperatures, the constant is high. When ambient temperature drops below the freezing point, the coating is intensively heated by the AC electric field due to the high dielectric constant and dielectric loss.

More particularly, when a ferroelectric material is placed in an oscillating electric field (AC), the material is heated by the field due to a dielectric loss. The heating power per cubic meter is:

$$W = \frac{\omega \varepsilon^1 \varepsilon_o}{4\pi} \tan\sigma(\overline{E^2}) \qquad (1)$$

where $\varepsilon'$ is a relative dielectric permittivity (usually $\varepsilon'$ is approximately $10^4$ for typical ferroelectrics), $\varepsilon_0$ is a dielectric permittivity of free space ($\varepsilon_0$=8.85E-12 F/m), $\omega$ is an angular frequency of the AC field ($\omega$=2Πf, where f is a usual frequency for the power line, e.g., 60 Hz in conservative power lines), tan $\delta$ is the tangent of dielectric loss, and ($\overline{E^2}$) is the average of electric field squared.

Ferroelectrics are characterized with very large values of $\varepsilon'$ and tan $\delta$ below the so-called Curie Temperature, $T_c$, and small $\varepsilon'$ and tan $\delta$ above $T_c$. Thus, the dielectric loss (or heating power of the AC electric field) is very high below and close to $T_c$; and it drops by a large factor (e.g., $10^6$) above that temperature. This makes ferroelectrics with $T_c$ close to or just above the melting temperature an optimum choice for a coating 306 such as described above. Such coatings absorb the electric power when the outside temperatures drop below the melting point, $T_m$, and are heated by the field to a temperature above $T_m$ so that they again transform into usual insulators (i.e., no longer absorbing the electric field in significant quantity).

Accordingly, when such coatings are placed in an AC field, the ferroelectric material maintains a constant temperature which is close to $T_c$ and just above $T_m$. This self-adjusting mechanism to prevent icing is very economic: the maximum heating power per one meter of the power line, or per m² at any surface to be protected, can be increased or decreased by changing the coating thickness and/or by adding a neutral (not ferroelectric) insulating paint or plastic to the coating. Examples of suitable ferroelectric materials according to the invention include:

TABLE 3

Ferroelectric materials

| Name | Formula | $T_c$ (Kelvin) |
|---|---|---|
| Rochelle salt | $NaKC_4H_4O_6 \cdot 4H_2O$ | 255–297 |
| Deuterated Rochelle salt | $NaKC_4H_2 \cdot D_2O_6 \cdot 4H_2O$ | 251–308 |
| TGSe | $(NH_2CH_2COOH)_3 \cdot H_2Se)4$ | 295 |
| Potassium tantalate niobate | $KT_{a2/3} N_{b1/3} O_3$ | 271 |
| Anti momium nitrate | $NH_4NO_3$ | 255, 305 |
| | $Pb_3MgNb_2O_9$ | ~273 K. (0 degrees C.) |

Figure 10:
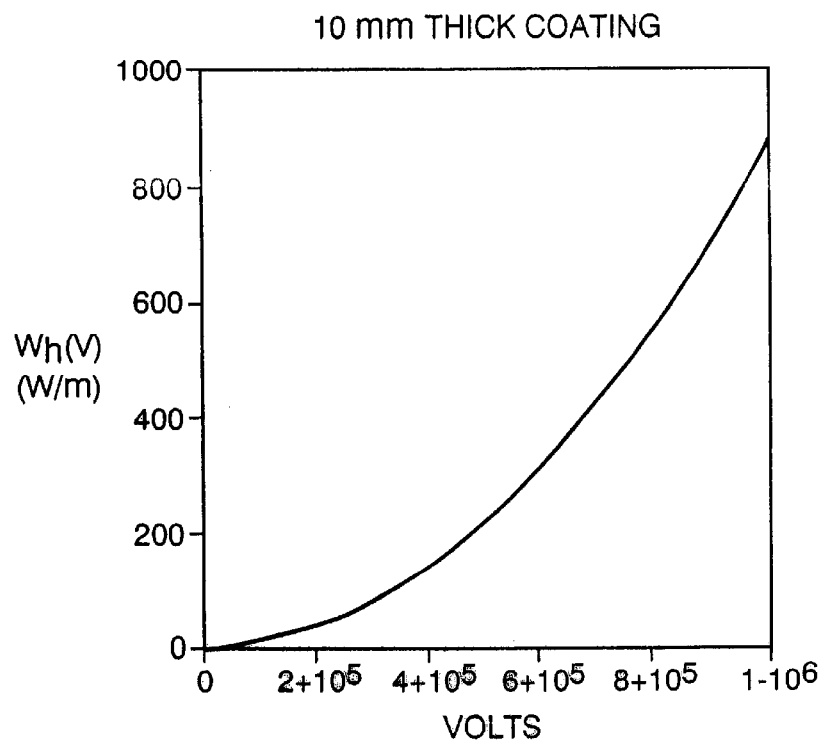
FIGS. 10–12 show the results of calculations of heating power, in units of W/m, as a function of voltage when using different thicknesses of a dielectric coating.
Figure 11:
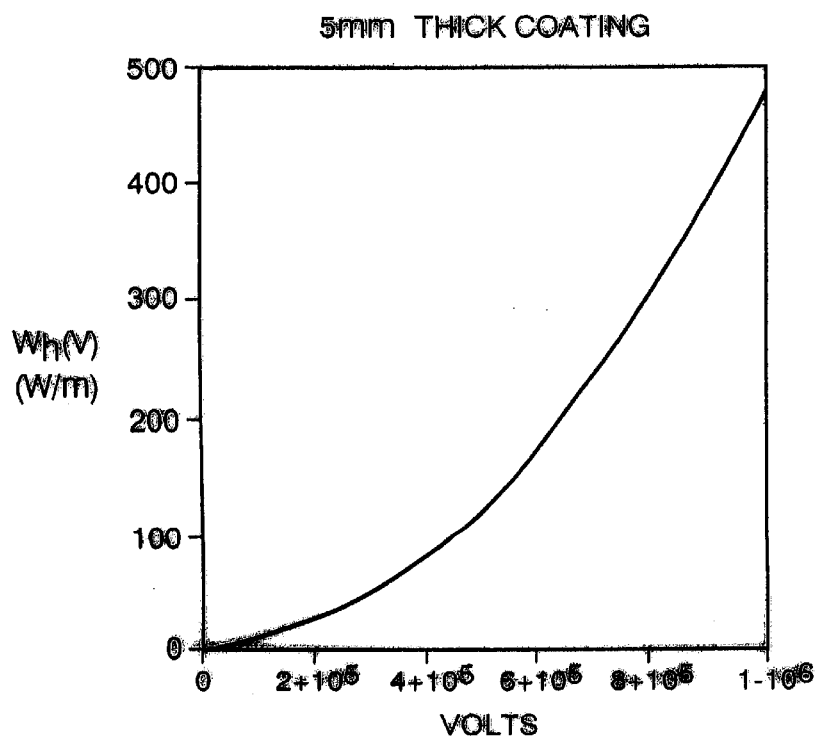
Figure 12:
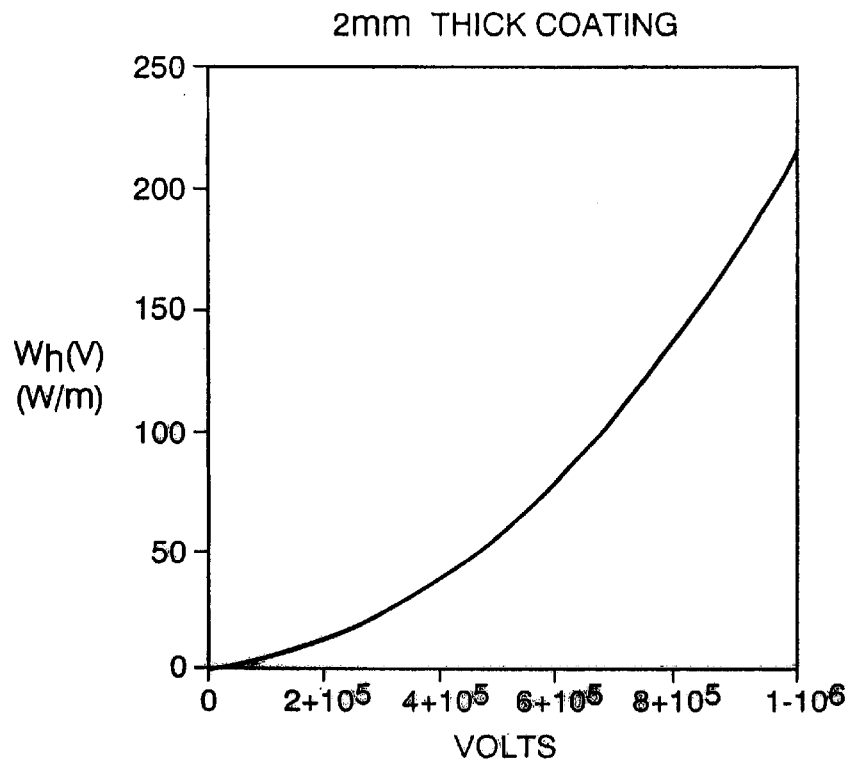

The thickness "t" is typically on the order of 1/100 of an inch, though other thicknesses can be applied depending upon coating materials and desired heating. By changing the thickness, for example, temperatures at the surface 308 a can be increased by 1–10 degrees, or more. The thickness "t" is chosen so that a desired amount of heat is generated (i.e., heat sufficient to generally melt ice and snow on the surface 308 of the line 300). FIGS. 10–12 show the results of calculations of heating power, in units of W/m, as a function of voltage when using different thicknesses of a dielectric coating. The heat dissipated from the coating is calculated from the following equation:

$$W_H(V) = \frac{V^2 \omega C_L^2}{2(C_L + C_c)} \qquad (2)$$

where V is voltage, $\omega$ is angular frequency, $C_L$ is interwire capacitance, and $C_c$ is coating capacitance. See FIG. 17. FIG. 10 shows the heating power as a function of voltage for a dielectric coating of 10 mm thickness. FIG. 11 shows the heating power as a function of voltage for a dielectric coating of 5 mm thickness. FIG. 12 shows the heating power as a function of voltage for a dielectric coating of 2 mm thickness.

Figure 13:
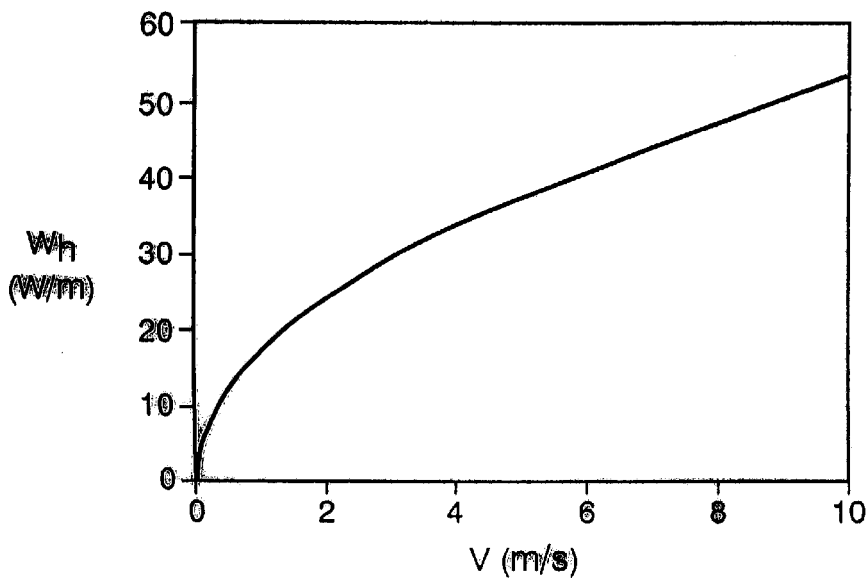
FIG. 13 shows the heat transfer from a 2.5 cm conductor with a ΔT of 10° C.
Figure 14:
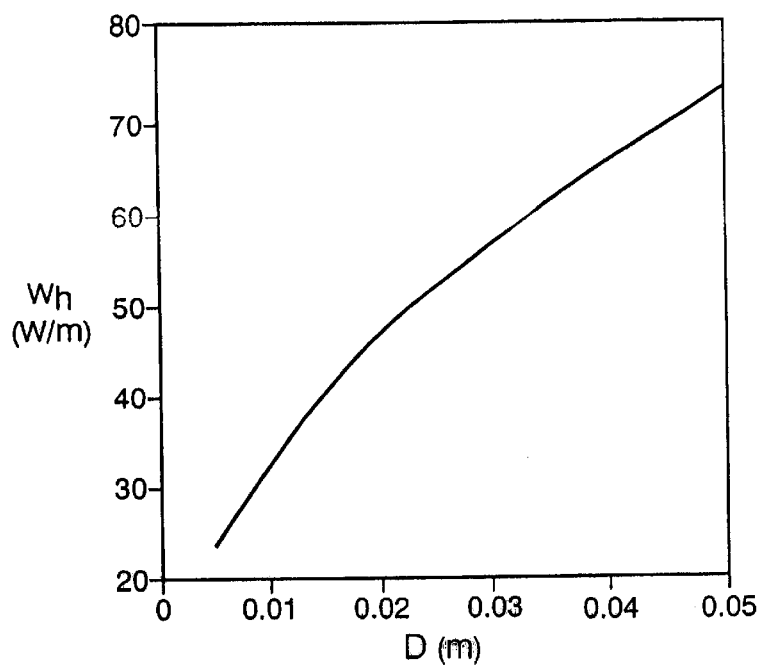
FIG. 14, heat transfer is plotted as a funciton of the diameter of the conductor with a wind velocity of 10 m/s.

In addition to thickness of dielectric coating, the heating power is also dependent on wind blowing on the power lines. FIG. 13 shows the heat transfer from a 1 inch conductor with a ΔT of 10° C. In the graph of FIG. 13, heat transfer is plotted as a function of the velocity of wind hitting the power line. The diameter of the conductor also will affect the heat transfer when wind is present. In the graph of FIG. 14, heat transfer is plotted as a funciton of the diameter of the conductor with a wind velocity of 10 m/s.

When the coating exhibits low dielectric constant and loss (i.e., when the coating is above "freezing" or some other desired temperature), much less heat is generated by the coating 306 and, thereby, much less energy is expended by the line 302.

EXAMPLE 3

Exemplary heating power calculations were conducted for $Pb_3MgNb_2O_9$. In this example, a middle range power line is considered with $$\sqrt{\overline{V^2}} = 10 \text{ kV}$$

and with a wire diameter of 1 cm=2×radius. The electric field strength on the wire surface is:

$$E \approx \frac{V}{\ln\left(\frac{L}{r}\right)r} \approx 3 \text{ kv/cm} \qquad (3)$$

where L is the distance between the wires (L=1 m). Substitution as above, i.e., $\overline{E^2}$=3×10⁵ V/m, $\omega$=2Π×60 Hz, $\varepsilon'$=104 and tan $\delta$=10, computes to W (1 mm, 60 Hz)=4.5×10⁵ watts/m³. A 1 mm thick film, for example, thus generates 450 watt/m², which is more than sufficient for typical melting of ice.

A frequency of 100 kHz at 300 kV heats a 1 mm thick coating of $Pb_3MgNb_2O_9$ at a rate 750 kWatt/m².

When applied to power lines, the maximum power that can be dissipated in the coating is limited by a capacitance $C_2$ between the wires:

$$W_{max} = \frac{\omega C_2}{2} \cdot \overline{V^2} \qquad (4)$$

For wires of 2 cm thickness, with 1 m distance between wires, $C_2 \approx 1.21E-11$ F/m. For a power line at V=350 kV, $W_{max} \approx 300$ Watt/m, which is sufficient energy to keep a 1 m long cable free of ice.

In addition to ferroelectrics, almost any semiconductor coating will provide similar effects. A semiconductor will absorb the maximum energy from the external AC electric field when its conductivity σ and dielectric permittivity ∈ satisfy the condition:

$$\frac{\varepsilon \varepsilon_0}{\sigma} = \tau_{max} = \frac{1}{2\Pi f} \quad (5)$$

where ∈ is the coating's dielectric constant, $\in_0$ is that of free space, and f is the frequency of the AC field. As a result, the dielectric loss depends on the conductivity σ. To reach the maximum performance of Equation (4), the coating dielectric conductivity a should satisfy the condition:

$$\sigma \approx \in \in_0 \omega \quad (6)$$

where ∈ is the coating's dielectric constant, and $\in_0$ is that of free space. For a 60 Hz line and $\in \approx 10$, $\sigma \approx 3.4E-8$ (ohm.m)⁻1. Such conductivity is very typical for many undoped semiconductors and low-quality insulators. Thus, such a coating is not expensive (certain paints qualify for these coatings). Moreover, temperature "tuning" can be achieved due to a strong temperature dependence of conductivity of semiconductor materials (e.g., an exponential dependence).

Figure 15:
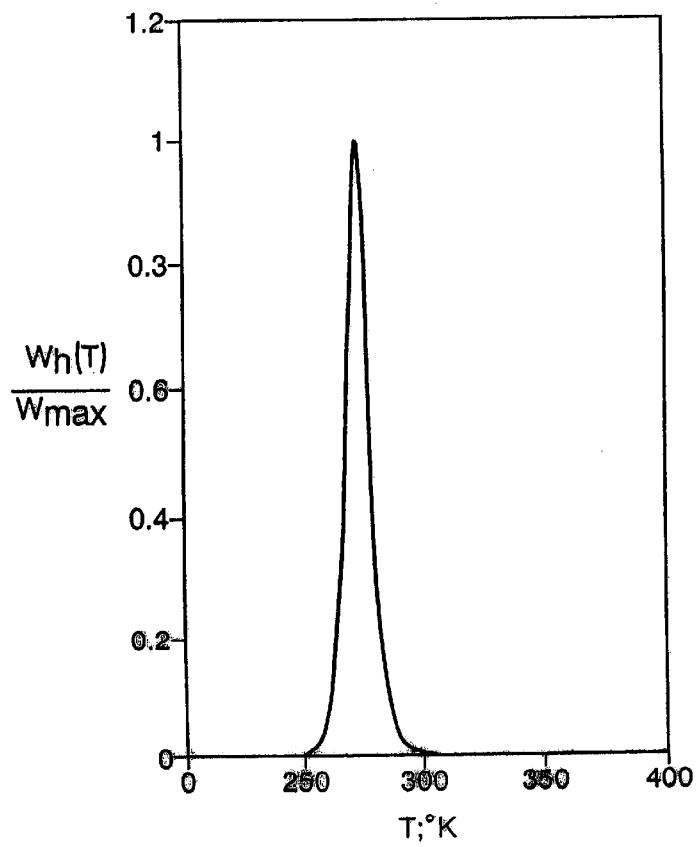
FIG. 15 shows the temperature dependence of normalized heating power of a 1 mm thick coating of ZnO on a 1000 MW power line, where the ice melting point is 273° K.

One suitable material for semiconductive coatings is ZnO. FIG. 15 shows the temperature dependence of normalized heating power of a 1 mm thick coating of ZnO on a 1000 MW power line, where the ice melting point is 273° K. As suggested by the curve in FIG. 15, optimal conditions for the type of dielectric heating described above is typically satisfied only in a narrow temperature interval, e.g., −10° C.≦T≦10° C., where the coating will melt ice, otherwise consuming little power. Those skilled in the art understand that dopants could always be used to adjust the temperature interval.

Those skilled in the art should appreciate that the above-described embodiment can be self-regulating in keeping the coating temperature close to (or slightly above) the melting point. If the coating is overheated by the power line's electric field, it automatically undergoes a phase transformation from the ferroelectric the normal state, at which point the coating stops absorbing the electric field energy. By choosing a phase transition temperature, therefore, the coating temperature can be adjusted per user needs and per the environmental conditions of the local area.

Figure 16:
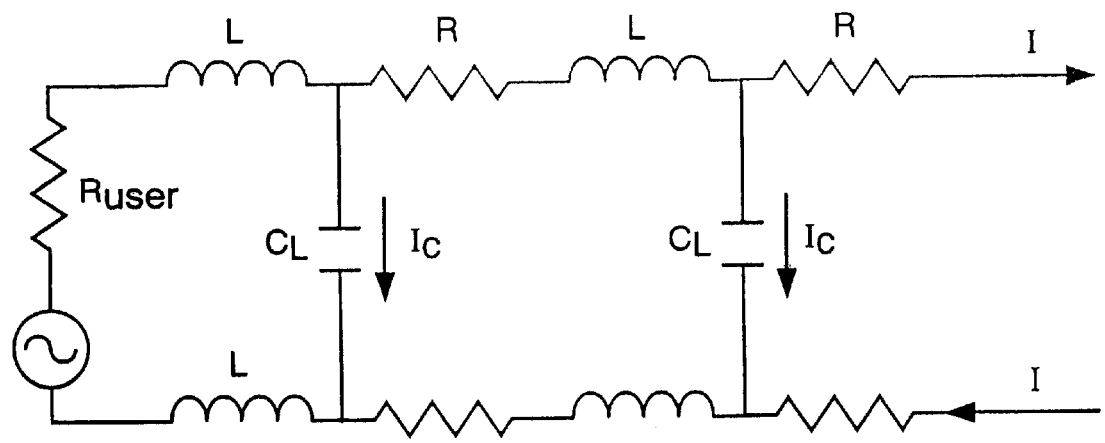
FIG. 16 shows an equivalent electric circuit of a power line without a coating.
Figure 17:
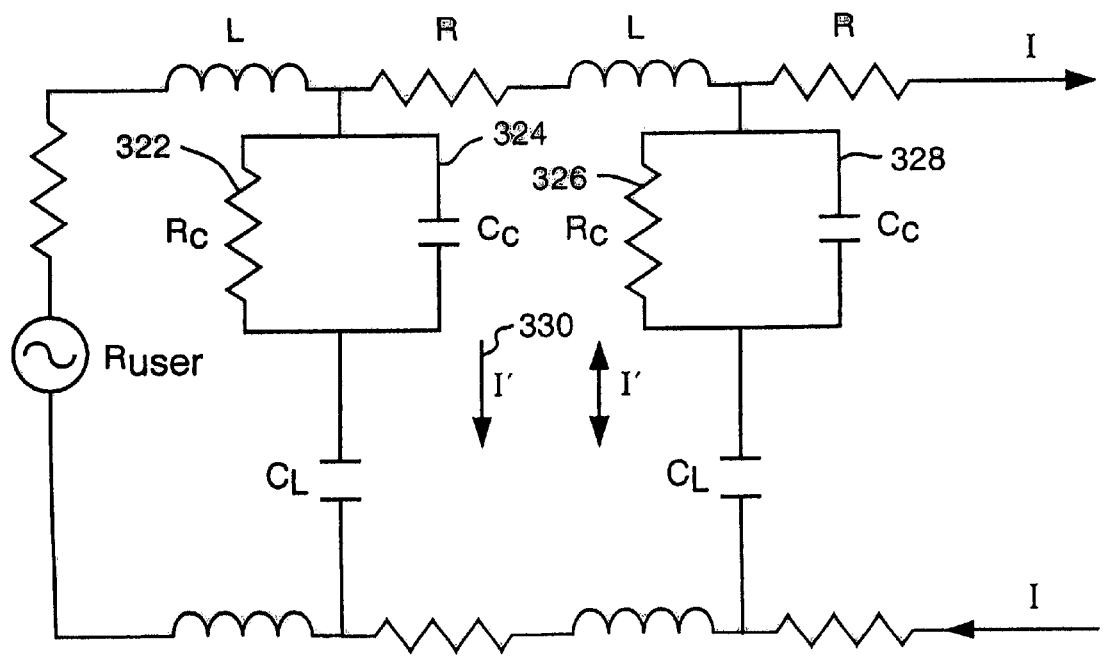
FIG. 17 shows an equivalent electric circuit of an identical power line with a coating.

FIG. 16 shows an equivalent electric circuit of a power line without a coating 306. Those skilled in the art understand the use of this configuration of resistors, capacitors, and inductors to represent the power line. FIG. 17 shows an equivalent electric circuit of an identical power line with a coating 306. The coating 306 uses the capacitance currents $I_C$, where $C_L$ is the interwire capacitance. The coating 306 is represented in FIG. 17 by the resistances, $R_C$ 322 and 326, and the capacitances, $C_C$ 324 and 328. In FIG. 17, a current flowing through the interwire capacitance $C_L$ and the coating is represented by I' 330. I' 330 is less than $I_C$ because of the added resistance and capacitance of the coating 306. Thus, the power loss in the rest active loads ($R_1$ $R_{user}$) decrease as a result of the heat dissipation in the coating.

The coating 306 can also comprise ferromagnetic materials with the same or similar effect. In this case, the coating absorbs the energy of the magnetic field generated by a power line.

Those skilled in the art should appreciate that the surface of objects other than described herein can also be treated with these coatings. For example, applying such a coating to an airplane wing will also provide melting capability by subjecting the coating to AC and, particularly, by increasing that AC as in Equation (19) above.

Figure 18:
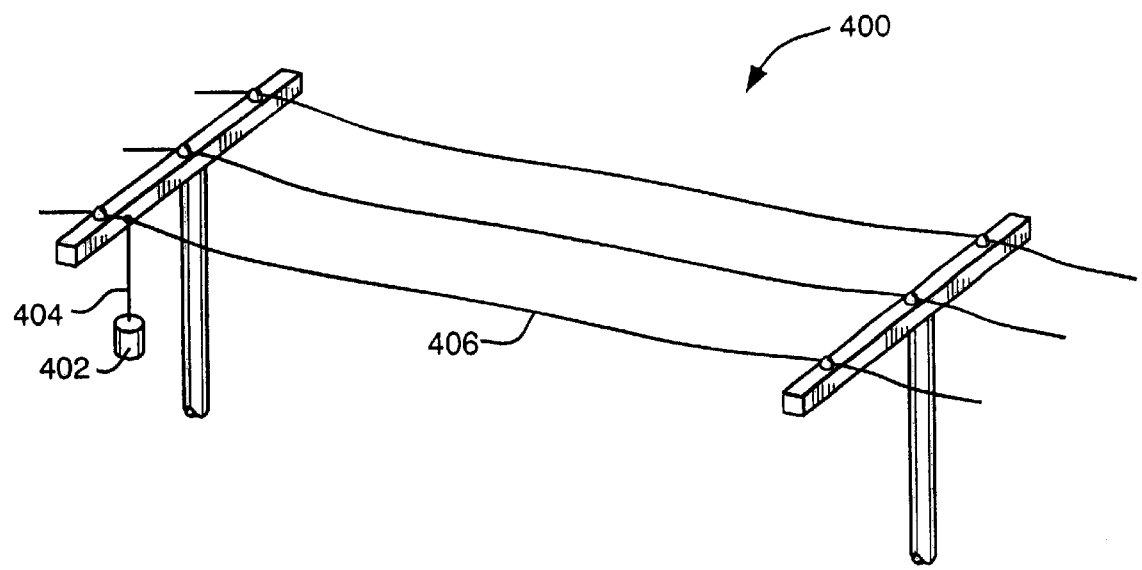
FIG. 18 illustrates an improved structure and system in accordance with the invention for controlling ice and snow on a power line.
Figure 19:
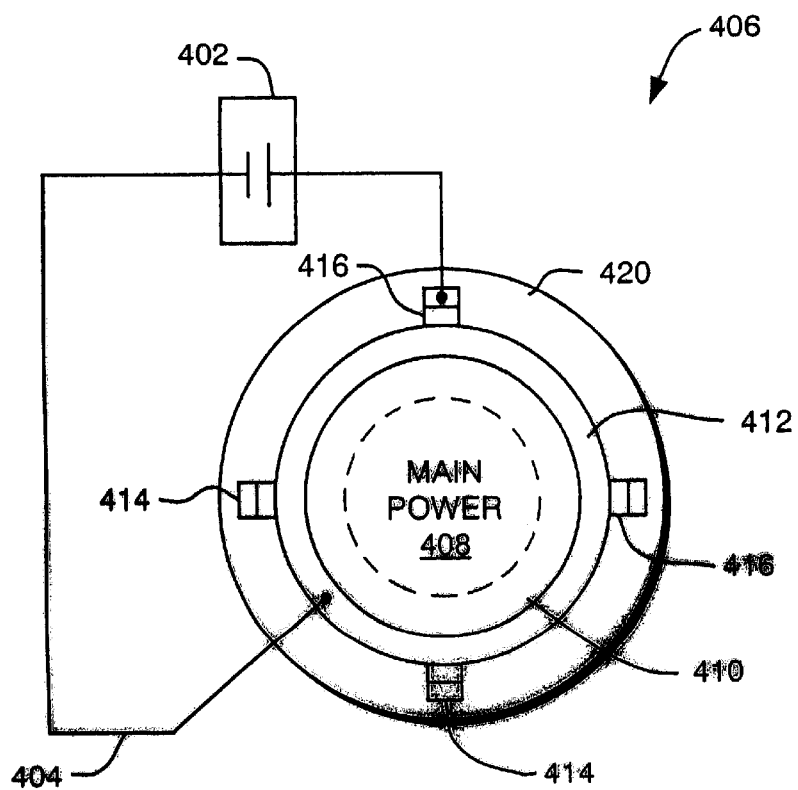
FIG. 19 depicts a cross-sectional view of a power line containing a main power line and an insulating layer.

FIG. 18 illustrates an improved structure and system 400 in accordance with the invention for controlling ice and snow on a power line 406 by decreasing adhesion strength. The system includes a power control module 402 (including functionality such as DC power supply, and preferably voltage regulation and DC and AC ice detection and measurement, as described herein) that is connected by wiring 404 to doped power line wiring 406. The wiring 406 is shown in an illustrative cross-sectional view (and not to scale) in FIG. 19. The wiring 406 includes a main power line 408 and an insulating layer 410, both of which are known to those skilled in the art. A doped outer layer 412 surrounds the insulating layer 410 to provide ice control DC bias in circuit with the module 402. A conductive grid 414 axially extends (with optional circumferential winding) along the length of the wiring 406 and is electrically insulated from the layer 412 by an insulating grid 416 (also axially disposed) between the grid 414 and the layer 412. When ice 420 forms on the wiring 406, the ice 420 shorts the circuit and a DC bias applies to the interface between the layer 412 and the ice. By regulating the bias to the correct magnitude, the removal of ice 420 from the wiring 406 is facilitated. Doped outer layer 412 preferably comprises a porous material that releases ions into the ice 420 to increase its conductivity, as discussed above with reference to FIG. 6. The outer surface of doped outer layer 412 may also or alternatively be covered by a SAM.

Figure 20:
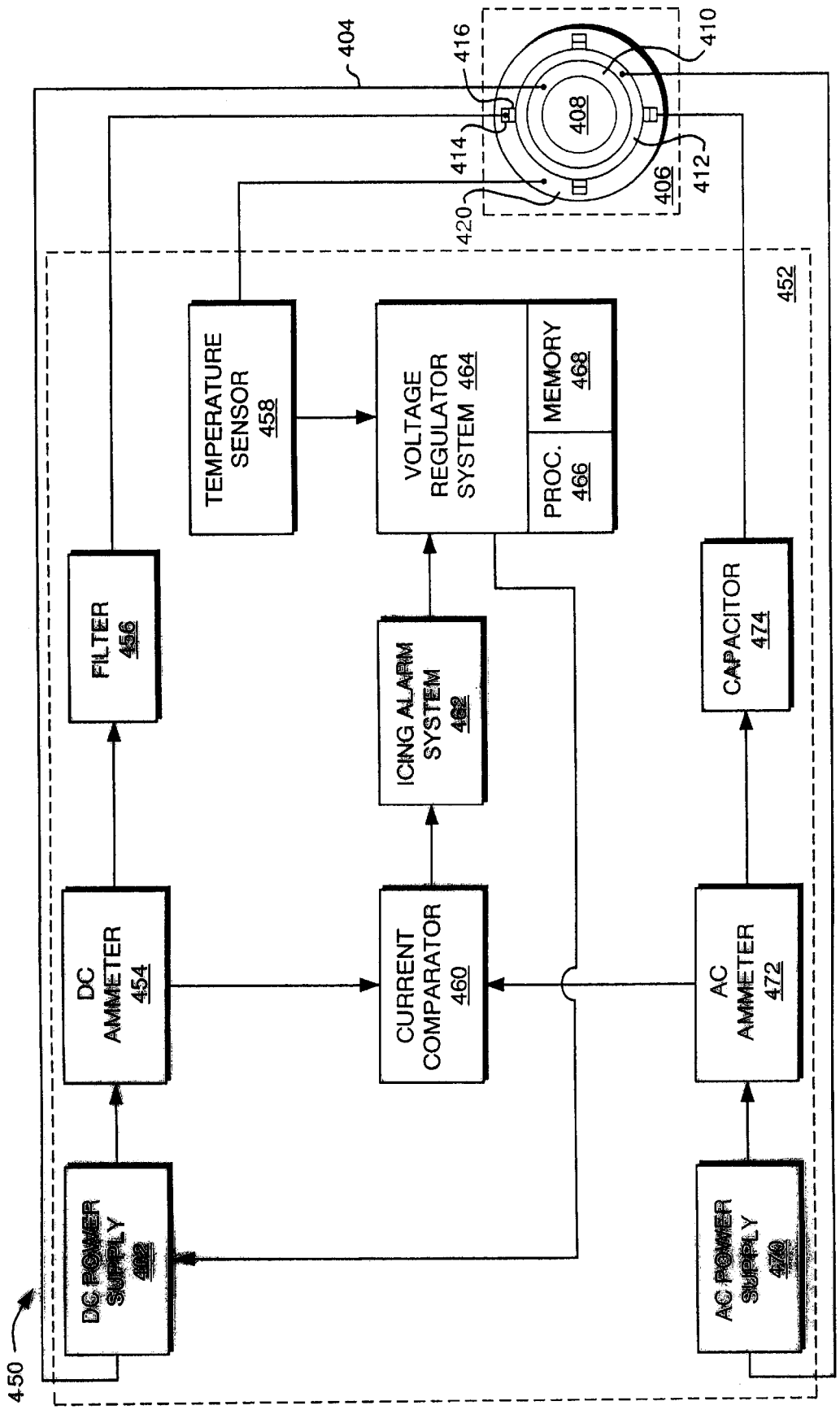
FIG. 20 depicts a power line de-icing system constructed in accordance with the invention.

FIG. 20 depicts a power line system 450 constructed in accordance with the invention. Power line system 450 comprises a power line wiring 406 (as in FIG. 19), and a power control module 452. Power control module 452 comprises a DC power supply 402, a DC ammeter 454, a filter 456, a current comparator 460, an icing alarm system 462, a temperature sensor 458, a voltage regulator system 464, an AC power supply 470, an AC ammeter 472, and a capacitor 474. DC power supply 402 is electrically coupled to the D ammeter 454 and doped outer layer 412. DC ammeter 454 is electrically coupled to the filter 456. Filter 456 is electrically coupled to the grid 414. Filter 456 prevents AC voltage from entering the D parts of the circuit, which should be accurately controlled to modify the ice adhesion strength. Filter 456 is the equivalent of an inductor and a capacitor with a resonant frequency of the AC power supply.

Voltage regulator system 464 is electrically coupled to DC power supply 402 to control the DC bias applied to the power-line/ice interface, depending on characteristics such as ice conductivity and temperature. Temperature sensor 458 preferably connects with ice 420 to measure the temperature of ice 420. Temperature sensor 458 is also electrically connected to voltage regulator system 464 to provide the temperature of the ice for determination of DC voltage.

Further features of power lines system 450 may include AC power supply 470, electrically connected to AC ammeter 472 and to doped outer layer 412. AC ammeter is electrically connected to capacitor 474, which in turn is electrically coupled to grid 414.

Current comparator 460 is electrically coupled to both AC ammeter 472 and DC ammeter 454. DC ammeter 454 may be used to measure the DC conductivity of ice 420. The DC conductivity measurement signal is provided to current comparator 460 and to voltage regulator system 464, which regulates the current supplied by DC power supply 402. AC ammeter 472 may be used to measure the AC conductivity of ice 420. The AC conductivity measurement signal is provided to current comparator 460 (and optionally to voltage regulator system 464 for calculation of the ratio AC/DC and for data processing). A comparison between the AC and DC conductivities is used by the system 450 to distinguish between water and ice, both of which "short" and complete the circuit. Specifically, the ratio of the AC to DC conductivity is 2–3 orders of magnitude greater in the case of ice as compared to water, providing a signal measurement which readily distinguishes ice over water. Current comparator 460 is electronically coupled to icing alarm system 462, which in turn is coupled to voltage regulator system 464.

As ice forms on the wiring 406, therefore, the current comparator 460 signals the icing alarm system 462 with the AC and DC currents. Upon receipt of the signal from the current comparator 460, the icing alarm system determines the AC and DC conductivities. Based on the AC and DC conductivities, the icing alarm system 462 determines if ice 420 is present. If ice 420 is present, icing alarm system 462 signals to voltage regulator system 464. Voltage regulator system 464 commands DC power supply 402 to increase or decrease the DC bias to minimize the ice adhesion strength of ice 420 on wiring 406. Voltage regulator system 464 includes a microprocessor 466 and a memory 468 to command and control DC power supply 402 a a near-optimum DC bias based upon feedback data, such as ice temperature and ice conductivity (or ice purity). The bias voltage is determined from a table of voltages stored in memory 468. Factors like temperature and conductivity may be used to identify the correct voltage.

Upon deicing of wiring 406, the signal differential received by current comparator 460 drops below a preset value, and current comparator 460 deactivates icing alarm 462. Simultaneously, current comparator 460 signals voltage regulator system 464, which in turn commands DC power supply 402 to decrease the bias to an initial level.

Figure 21:
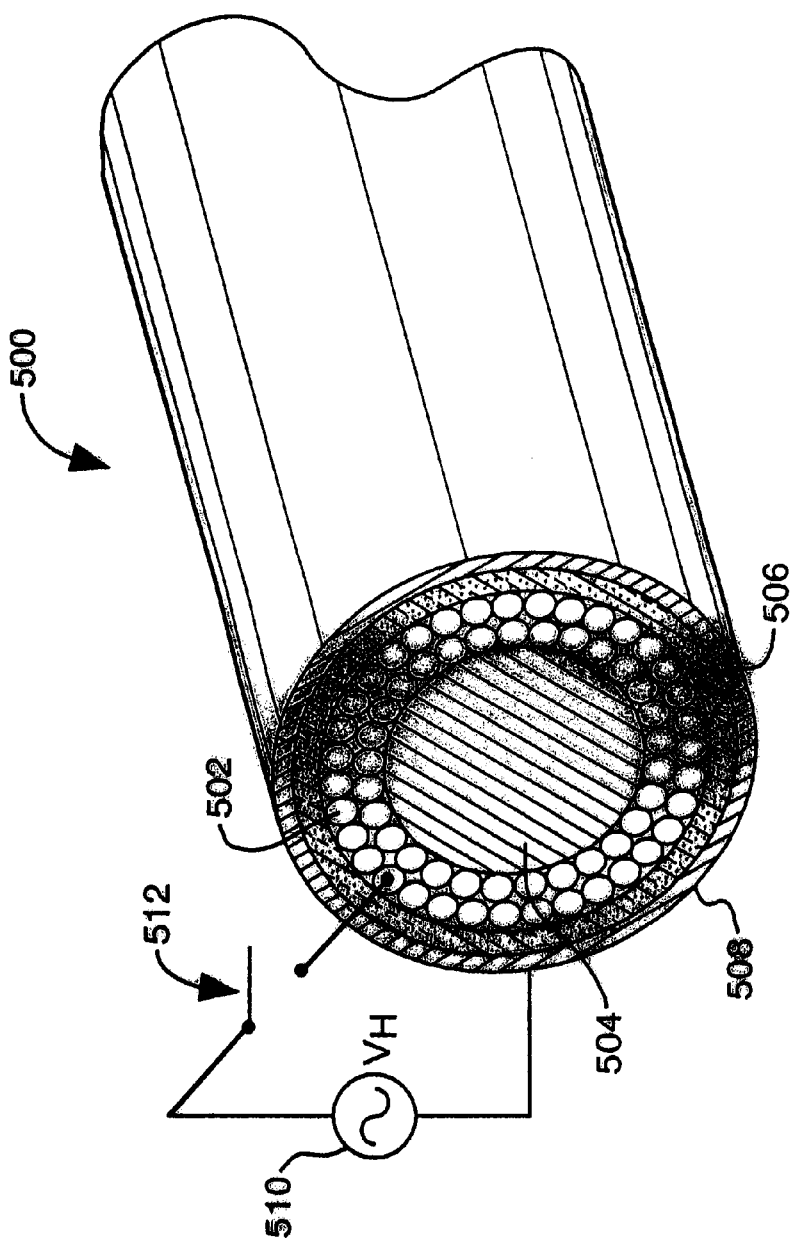
FIG. 21 shows an improved embodiment for heating in accordance with the invention, having a structure and system in which an AC power source powers the coatings instead of an interwire electric field.

FIG. 21 shows an improved embodiment for heating in accordance with the invention, having a structure and system in which an AC power source powers the coatings instead of an interwire electric field. FIG. 21 depicts a cross-sectional view of a power line 500. The power line 500 comprises cylindrically-shaped layers. The center of the power line 500 is a steel core 504. Surrounding the steel core 504 are main conductors 502, typically of aluminum. Outside the main conductors is a coating 506, typically a lossy dielectric, ferroelectric or semiconductive coating. The coating 506 is surrounded by an outer conductive shell 508, typically of aluminum. Also, an AC power source $V_H$ 510 is connected to outer conductive shell 508 and a switch 512. Switch 510 is also connected to the main conductors 502. In this embodiment, the AC power source substitutes for power from an interwire electric field.

The use of the AC power source provides many advantages. First, the deicing can be fully controlled by the switch 512 to deice the power lines on demand. Second, power levels can be varied to heat wires. Also, this embodiment may be applied to low voltage power lines (below 100–345 kV), in addition to high voltage power lines.

Figure 22:
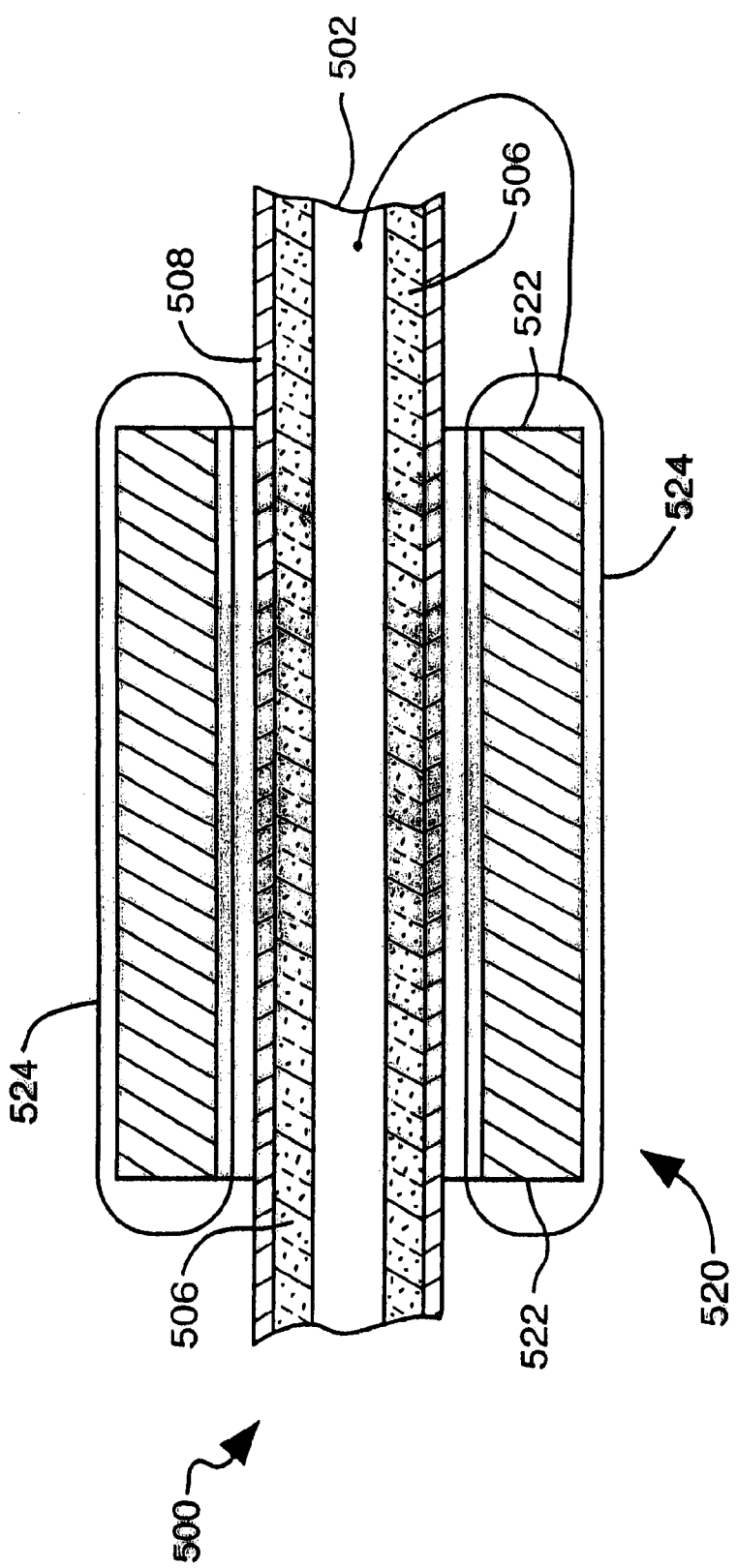
FIG. 22 discloses a possible configuration of a transformer installed on power line.

The AC power source 510 could be a power station. Another AC power source 510 could be from a transformer installed at given lengths along the power line. FIG. 22 discloses a possible configuration of a transformer 520 installed on power line 500. Transformer 520 comprises a ferroelectric core 522 covered by a winding 524. Winding 524 is connected to the conductive shell 508 and the main conductor 502.

This embodiment could operate at a higher frequency, for example, with a power supply operating at a frequency of 6.0 kHz. This frequency is 100 times the base frequency of 60 Hz, but much lower than conventional radio frequencies. The strong dependence of heating power of the coating on the frequency shows why the power line will be heated when the 6 kHz voltage is applied instead of the 60 Hz electric field. The heating power of the coating can be shown in the following equation:

$$W = \frac{V^2 \omega^2 R C_1^2}{1 + \omega^2 R^2 (C_1 + C_2)^2} \qquad (7)$$

where V is the voltage, $\omega$ is the angular frequency (2Πf, R is the active resistance (per meter), $C_1$ is an efficient interwire capacitance, and $C_2$ is the coating's capcitance (per meter). The maximum power occurs when:

$$R = \frac{1}{\omega(C_1 + C_2)} \qquad (8)$$

Combining Equations 25 and 26 will result in the maximum power $W_H$:

$$W_H = \frac{V^2 \omega C_1^2}{2(C_1 + C_2)} \qquad (9)$$

When the coating reaches the condition for maximum power at the frequency $f_0 = \omega_0/2\Pi$, then the heating power at any other frequency f is shown in the following equation:

$$W = \frac{2W_H (f/f_0)^2}{1 + (f/f_0)^2} \qquad (10)$$

Figure 23:
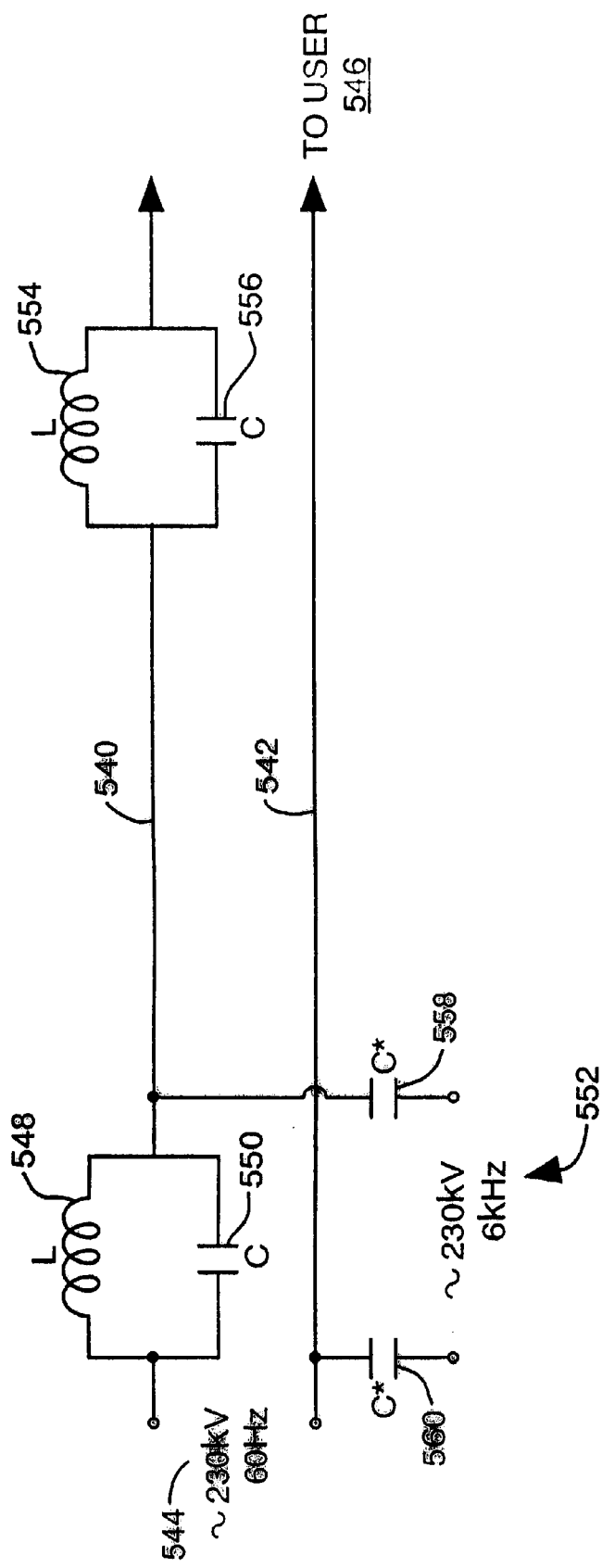
FIG. 23 depicts a circuit diagram in which two resonance contours are used to prevent a 6 kHz voltage from passing to a 60 Hz power supply.

A sketch of a possible electrical circuit for an embodiment using a power supply to deice the power lines is shown in FIG. 23. In FIG. 23, two resonance contours, 558 and 560, are used to prevent a 6 kHz voltage from passing to the 60 Hz power supply 544 and a user 546.

In another embodiment, the coating of a power line is a ferromagnetic material, as known in the art. A ferromagnetic coating with $T_C = T_M$ could melt ice in the same manner as the ferroelectric material by transferring the AC power of the power line electric field into heat.

Figure 24:
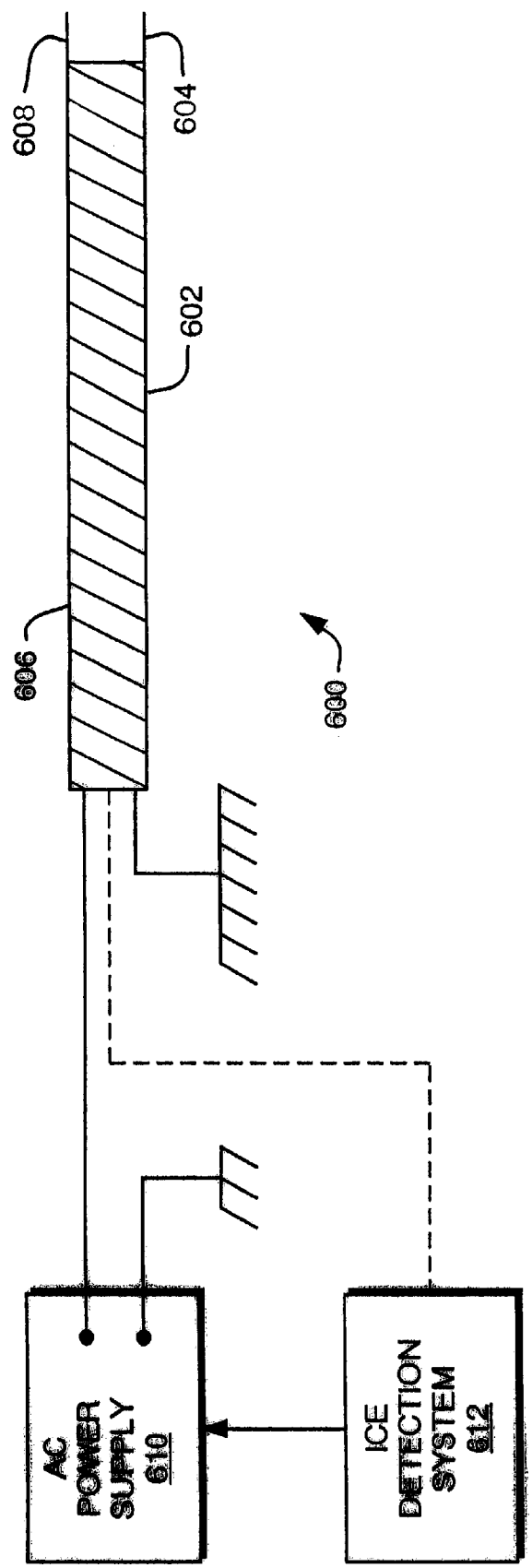
FIG. 24 depicts a generalized structure and system in accordance with the invention utilizing a dielectric or ferroelectric coating to de-ice a non-active surface (i.e., a surfaces without internal AC electric fields)

FIG. 24 depicts a generalized structure and system 600 in accordance with the invention utilizing a dielectric or ferroelectric coating to de-ice a non-active surface (i.e., a surfaces without internal AC electric fields). In FIG. 24, a foil electrode 604 is disposed on the surface 602 of a structure or object to be protected from icing. A ferroelectric coating of 606 is disposed on the foil electrode 604. A foil electrode 608 is located on ferroelectric coating 606. Foil electrodes 604, 608 provide for application of AC power to the ferroelectric coating 606. The AC power derives from a standard AC power supply 610. An ice detection system 612 (e.g., the detection system of FIG. 5), in circuit with the structure 600, preferably informs the power supply 610 of ice on the structure 600, whereinafter AC power is applied. The AC frequency and coating thickness are chosen to generate heat at the desired quantities (e.g., so as to keep ice from forming on an aircraft wing).

The invention also provides for a power-line de-icing technology in which a coating is heated with conventional 50–60 Hz electric field. The de-icing technique is fully controllable in that it can be swiched "on" or "off". Thus, no electric power is wasted when there are no icing or snow conditions. With reference to the structure of FIG. 21, to switch the heating off, the inner conducting cable 502, 504 is electrically connected by switch 512 to an outer conductive shell 508, with the dielectric coating between them. This provides zero potential difference across the ferroelectric, lossy-dielectric or other dielectric coating and, therefore, zero heating power. The outer conductive shell 508 may be very thin (0.1 to 1 mm) and, therefore, inexpensive. The outer conductive shell 508 may comprise aluminum or another metal or any conductive or semiconductive material, for example; polyurethane impregnated with carbon. When connected with the inner metal core (most of the time), it increases total cable conduction. Switching "on" and "off" may be done with a radio-controlled remote switch. The power line company typically installs one such simple (low-voltage, low power compare to the line's voltage) switch about every 100 km. Development of a lossy-dielectric coating then becomes inexpensive and simple because it must not be precisely "temperature tuned". Wider variety (and cheaper) materials can be used for the coating. These features thus provide for an electric switch that enables and disables heating of the power line selectively. Equivalent structures and methods may be used for other objects, besides power lines, to prevent or remove ice and snow.

Figure 25:
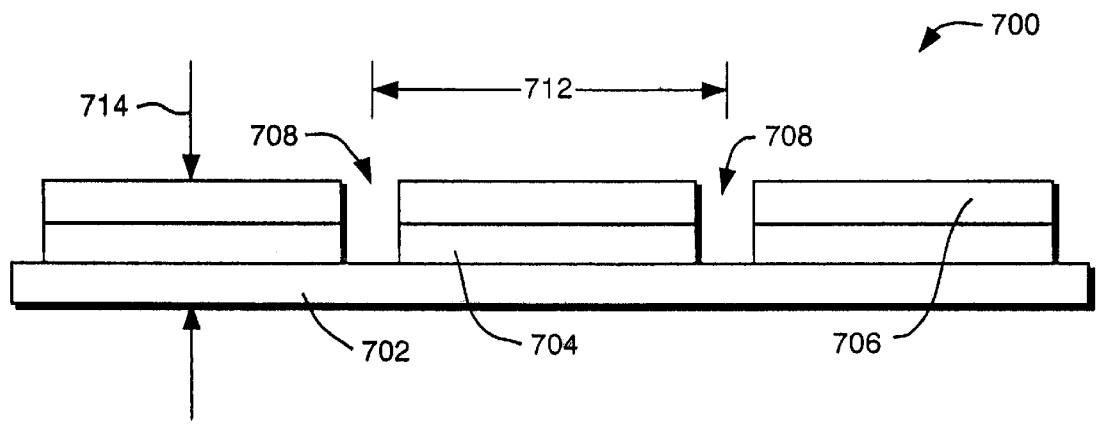
FIG. 25 depicts a cross-sectional view of a structure with spaced-apart electrodes.
Figure 26:
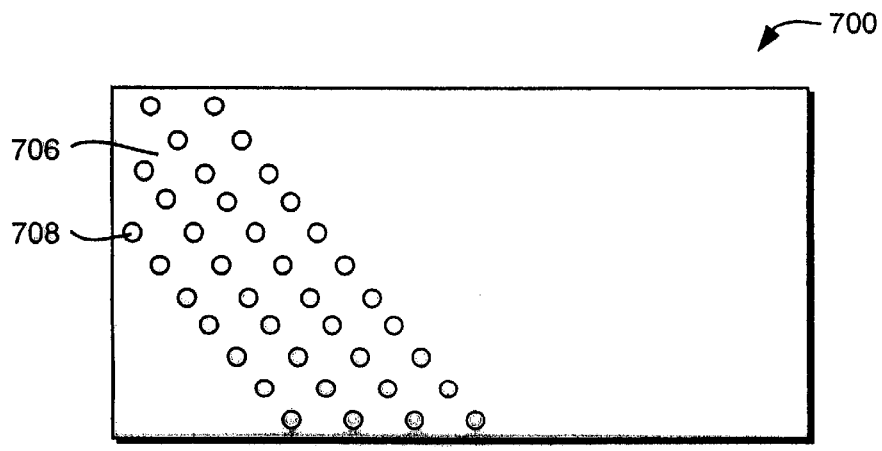
FIG. 26 depicts a top view of an embodiment of FIG. 25.
Figure 27:
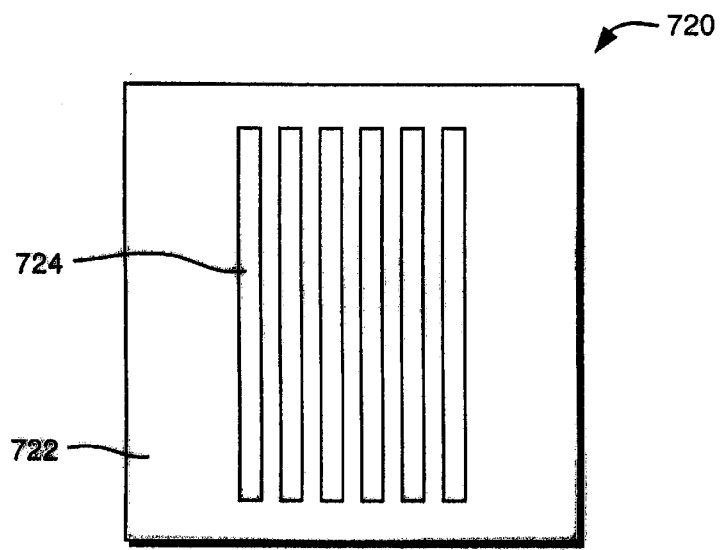
FIG. 27 depicts a structure comprising a substrate surface on which spaced-aprt linear electrodes are disposed.

Embodiments in accordance with the invention also provide for spaced electrode configurations, as set forth below in FIGS. 25–27. FIG. 25 depicts a cross-sectional view of a structure 700 with spaced-apart electrodes 706. A conductive substrate surface 702 is typically covered with an insulating layer 704 and an outer conductive (or semiconductive) layer. Holes 708 through the outer conductive layer and insulating layer, down to the substrate surface form spaced apart electrodes 706. The space-to-space distance 712 is typically 10 to 100 $\mu$m. The total thickness of the layered structure comprising conductive substrate 702, insulating layer 704 and outer electrode layer 706 is typically about 10 $\mu$m. FIG. 26 depicts a top view of an embodiment in accordance with the invention as depicted in FIG. 25. Those skilled in the art should appreciate that different configurations of the electrode spacing may be made. For example, in FIG. 27, a structure 720 comprises a substrate surface 722 on which linear electrodes 724 are disposed. Preferably, the electrodes 724 are spaced apart by 10–50 $\mu$m, and each electrode has a width of 10–50 $\mu$m. An exemplary fabrication method for making spaced-apart electrodes in accordance with the invetnion includes: coating the surface with polyurethane; applying a layer of photoresist; exposing with light the exposure region definging the electrode grid pattern (e.g., holes in FIG. 25, strips in FIG. 27); removing exposed regions to expose polyurethane; applying graphite powder; heating to diffuse graphite into the polyurethane. This method makes the electrodes durable and non-corrosive. The resulting structure essentially contains an electrode grid formed of plastic doped with carbon (a conductor), forming the exact pattern by photolithography.

Figure 28:
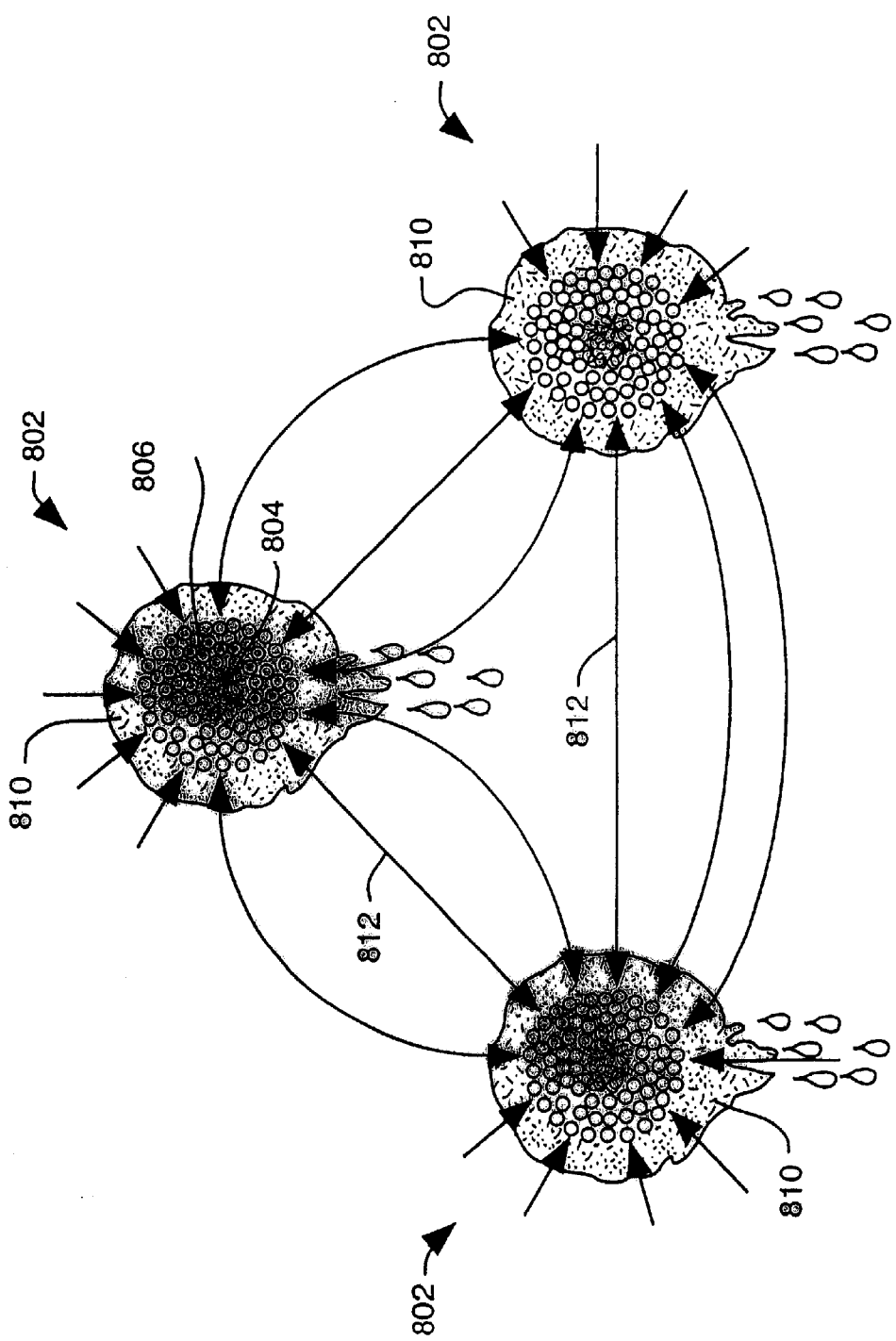
FIG. 28 depicts a de-icing system in which ice itself is used as the lossy dielectric coating.

In the embodiments described above, a dielectric coating was disposed on a power line, and either the interwire electric field or a specifically applied AC voltage was used to heat the coating and, thereby, melt ice. In a further embodiment of the invention, depicted in FIG. 28, ice itself is used as the dielectric coating. FIG. 28 depicts three typical power lines 802, each comprising a steel core 804 surrounded by aluminum conductors 806 and covered by ice 810. Electric field lines 812 represent a high-frequency interwire electric field. Ice is a lossy dielectric with a maximum dielectric loss at so-called Debye frequency fD. When placed in an alternating electric field of that frequency and of sufficient strength, ice melts. This is the same mechanism that uses an open lossy-dielectric coating (i.e., with no outer conductive layer), as depicted in FIG. 9, but now with ice as the coating. Ice has the maximum of dielectric loss in a frequency range from 8.8 kHz (at 0° C.) to 3 kHz (at –10° C.). Thus, to reduce or eliminate icing of power lines, one applies an AC voltage of this frequency to the cables. When there is no ice, there is no power consumption. This provides an inexpensive and simple solution to the problem of icing. When ice appears on the cables, the system works as a dielectric coating heated by the AC electric field, melting the ice. Water on the cables does not absorb AC power because water has a dielectric-loss maximum in a microwave frequency range. The same principle works for refrigerators and for airplanes.

Figure 29:
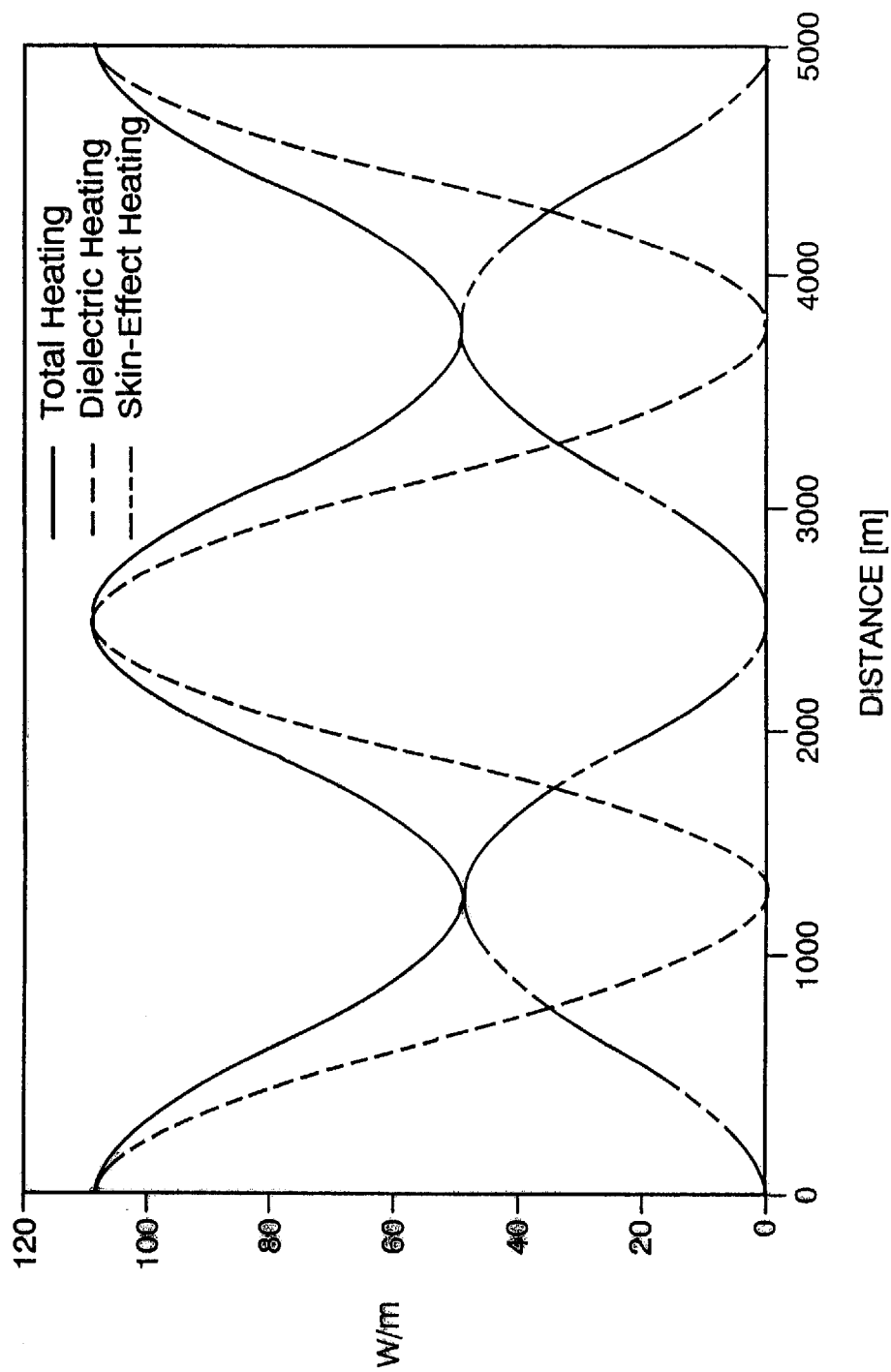
FIG. 29 shows a graph in which heating power in units of W/m is plotted as a function of distance in meters, m, from a power source.
Figure 30:
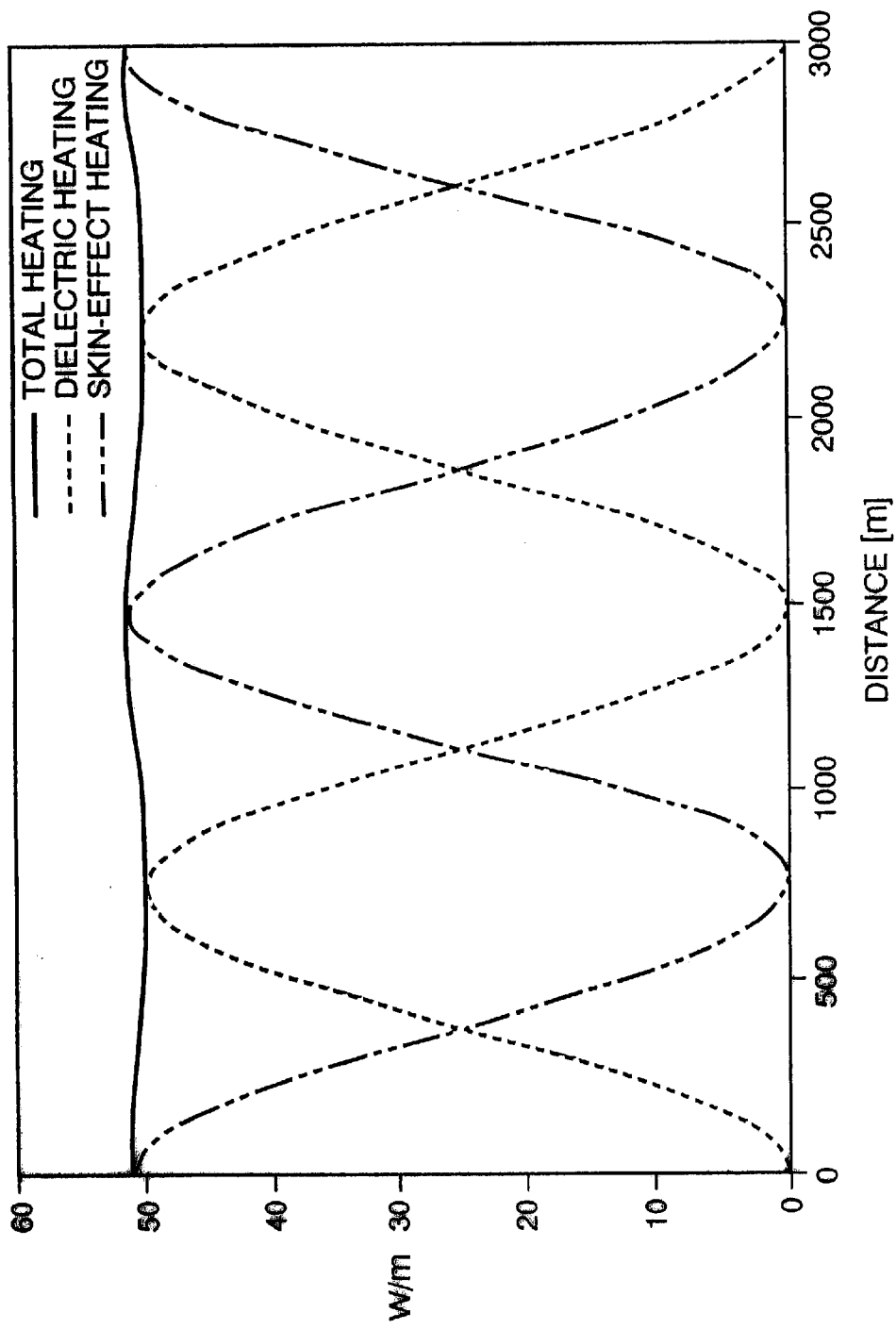
FIG. 30 shows the total heateffect over a distance of 3000 m in a power line utilizing both dielectric loss and skin effect heating.
Figure 31:
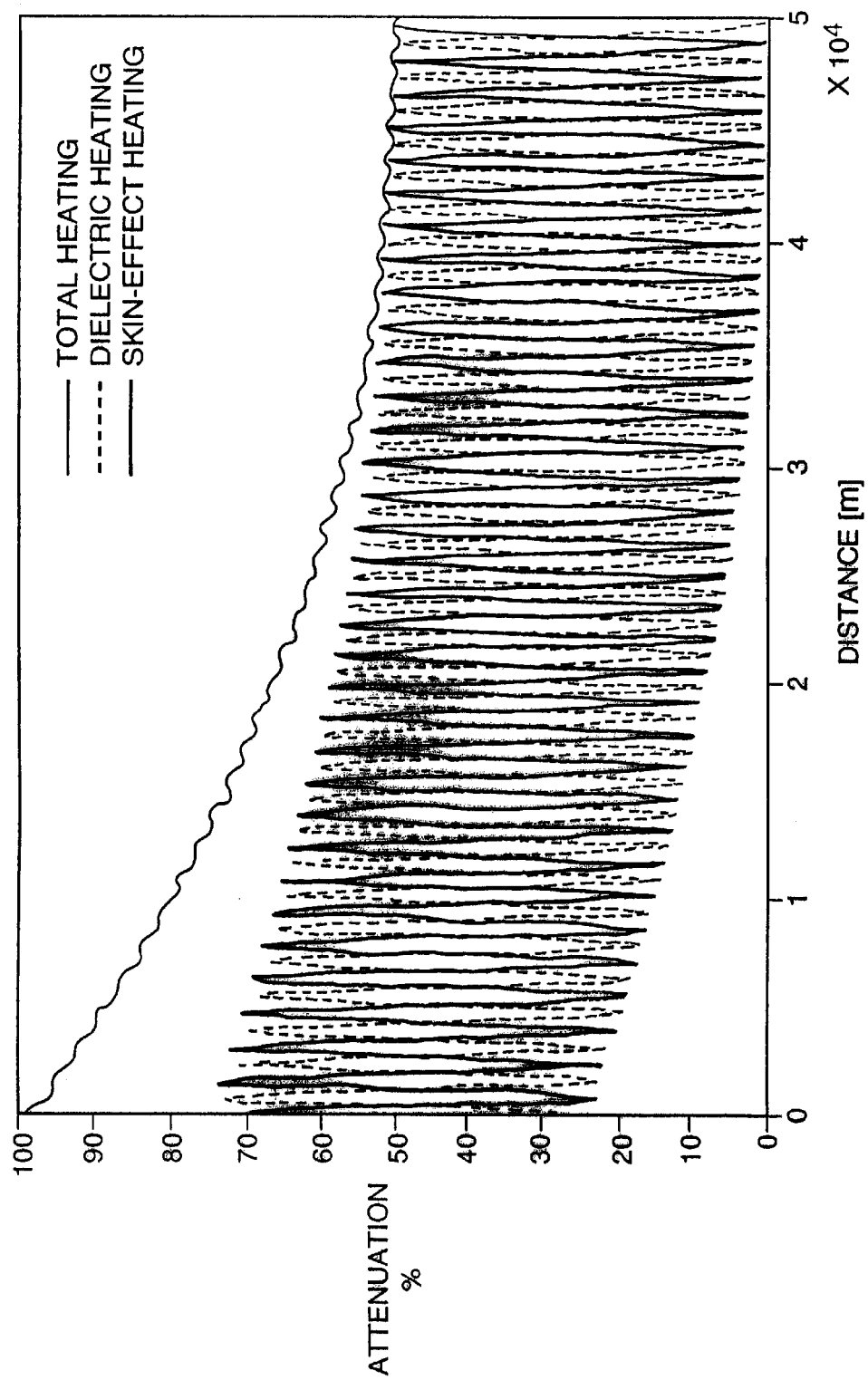
FIG. 31 depicts the calculated percentage attenuation of heating effects of the improved embodiment of FIG. 30 over a distance of 50 km.

In a further embodiment in accordance with the invention, skin-effect heating is used to melt ice on a long-distance power line. A magnetic field pushes electrical current lines towards the surface of a conductor. In a case of high-frequency current flow in aluminum at 60 kHz, for example, the electrical resistance in the outer 0.35 mm of a power line is increased by a factor of approximately 20. With 221 amps of current, this results in a maximum heating power of approximately 50 W/m. A drawback of this method and structure, however, is that the heating is subject to standing wave phenomena, resulting in non-uniform heating and melting. A further embodiment of the invention combines high-frequency ("HF") ice dielectric loss and the HF skin effect. Both ice dielectric loss and the skin effect are subject to standing wave phenomena, but the peaks and valleys of heating from the two effects are complementary and the magnitudes are similar. This embodiment in accordance with the invention is depicted in the graph of FIG. 29, in which heating power in units of W/m is plotted as a function of distance in meters, m, from a power source. In an improved embodiment, the frequency of the current through the power line is adjusted to balance the heating effects. The resulting improved performance is depicted in the graph of FIG. 30, which shows that the total heat effect is relatively constant at about 50 W/m over a distance of 3000 m. FIG. 31 depicts the calculated percentage attenuation of heating effects of the improved embodiment of FIG. 30 over a distance of 50 km. The data of FIG. 31 indicate that a 100 km power line could be heated and de-iced using a single driver located at the center. The power source for a 50 km line possesses about 3.25 MW at 60 kHz.

The invention thus attains the objects set forth above. Since certain changes may be made in the above apparatus and methods without departing from the scope of the invention, it is intended that all matter contained in the above description or shown in the accompanying drawing be interpreted as illustrative and not in a limiting sense.

We claim:

1. A system of removing ice and snow from a power line, comprising:
   a power line comprising an electrical conductor and an outer surface;
   an AC power source to provide high-frequency AC current through the electrical conductor; and
   ice formed on at least part of the surface, the ice being capable of absorbing energy from a high-frequency alternating electric field to generate heat.

2. A system as in claim 1, wherein the AC power source generates current having a frequency in a range of about 1.0 kHz to 100 kHz.

3. A system as in claim 1, further comprising a resonance contour to prevent high-frequency voltage from passing to a low-frequency power line.

4. A system as in claim 1, further comprising a means for frequency-tuning high-frequency AC current to balance ice dielectric loss heating and skin-effect heating.

5. A system of removing ice and snow from a surface, comprising:
an electrical conductor;
an AC power source to provide high-frequency AC current through the conductor; and
ice formed on at least part of the surface, the ice being capable of absorbing energy from a high-frequency alternating electric field to generate heat.

6. A system as in claim 5, wherein the AC power source generates current having a frequency in a range of about 1.0 kHz to 100 kHz.

7. A system as in claim 5, wherein the surface is the surface of an object selected from the group consisting of an airplane wing and a refrigerator.

8. A system of removing ice and snow from a surface, comprising:
an electrical conductor;
an AC power source to provide an AC current through the conductor;
a coating at the surface, the coating having a thickness and being capable of absorbing energy from an alternating electric field to generate heat; and
an outer conductive shell, wherein the coating is between the-electrical conductor and the outer conductive shell.

9. A system as in claim 8, wherein the electrical conductor and the outer conductive shell have an electrical connection and there is no potential difference across the coating.

10. A system as in claim 9, wherein the electrical connection can be switched "on" and "off".

11. A system as in claim 8 wherein the coating has a thickness, the thickness selected to correspond to a desired heat to be generated by the coating.

12. A system as in claim 8, wherein the coating includes a material selected fro the group consisting of lossy dielectric, ferroelectric, ferromagnetic and semiconductor materials.

13. A system as in claim 8, wherein the coating is a ferroelectric material having a Curie Temperature, Tc, in the range of from 250° to 277° K.

14. A system as in claim 8, wherein the amount of heat generated changes as a function of temperature, the amount being higher below freezing temperature than above freezing temperature.

15. A system as in claim 14, wherein the coating contains a dopant to adjust the function between the amount of heat generated and temperature.

16. A system as in claim 8, wherein the AC power source generates current having a frequency in the range of about 40 to 60 Hz.

17. A system as in claim 8, wherein the AC power source generates current having a frequency in a range of about 1.0 kHz to 100 kHz.

18. A system as in claim 8, further comprising a transformer for increasing voltage drop along the conductor.

19. A method of removing ice and snow from a surface of a power line, comprising steps of:
flowing a high-frequency AC current through the power line to provide a high-frequency alternating electric field at a surface, whereby ice located on the surface absorbs energy from the alternating electric field to generate heat.

20. A method as in claim 19, wherein the AC current has a frequency in a range of about 1.0 kHz to 100 kHz.

21. A method as in claim 19, further comprising a step of:
frequency-tuning the high-frequency AC current to balance ice dielectric loss heating and skin-effect heating.

22. A method as in claim 19, wherein the step of flowing high-frequency AC current includes providing AC power having a voltage in arrange of from 100 to 1000 kV.

* * * * *

UNITED STATES PATENT AND TRADEMARK OFFICE
CERTIFICATE OF CORRECTION

PATENT NO. : 6,723,971 B1
DATED : April 20, 2004
INVENTOR(S) : Petrenko, Victor et al.

It is certified that error appears in the above-identified patent and that said Letters Patent is hereby corrected as shown below:

Column 21,
Lines 32-38, should read as follows:

11. A system as in claim 8, wherein the coating has a thickness, the thickness selected to correspond to a desired heat to be generated by the coating.
    12. A system as in claim 8, wherein the coating includes a material selected from the group consisting of lossy dielectric, ferroelectric, ferromagnetic and semiconductor materials.

Column 22,
Lines 34-36, should read as follows:

22. A method as in claim 19, wherein the step of flowing high-frequency AC current includes providing AC power having a voltage in a range of from 100 to 1000 kV.

Signed and Sealed this

Tenth Day of August, 2004

JON W. DUDAS
*Acting Director of the United States Patent and Trademark Office*